(12) United States Patent
Iwase et al.

(10) Patent No.: US 8,303,467 B2
(45) Date of Patent: Nov. 6, 2012

(54) CONTROL APPARATUS FOR VEHICULAR DRIVE SYSTEM

(75) Inventors: Yuji Iwase, Mishima (JP); Tooru Matsubara, Toyota (JP); Hiroyuki Shibata, Toyota (JP); Atsushi Tabata, Okazaki (JP)

(73) Assignee: Toyota Jidosha Kabushiki Kasiha, Toyota (JP)

( * ) Notice: Subject to any disclaimer, the term of this patent is extended or adjusted under 35 U.S.C. 154(b) by 1034 days.

(21) Appl. No.: 12/078,630

(22) Filed: Apr. 2, 2008

(65) Prior Publication Data

US 2009/0082154 A1  Mar. 26, 2009

(30) Foreign Application Priority Data

Apr. 6, 2007 (JP) .................. 2007-101184

(51) Int. Cl.
*F16H 59/00* (2006.01)
*F16H 48/06* (2006.01)
*B60W 10/04* (2006.01)
*B60W 10/00* (2006.01)
*B60W 10/06* (2006.01)

(52) U.S. Cl. ..... 477/98; 477/107; 475/153; 180/65.265; 180/62.28

(58) Field of Classification Search ............ 477/98, 477/3, 107; 475/5, 149, 150, 153; 180/65.265, 180/65.275, 65.28
See application file for complete search history.

(56) References Cited

U.S. PATENT DOCUMENTS

| | | | |
|---|---|---|---|
| 4,034,626 A * | 7/1977 | Udagawa et al. | 477/98 |
| 6,527,658 B2 * | 3/2003 | Holmes et al. | 475/5 |
| 7,179,187 B2 * | 2/2007 | Raghavan et al. | 475/5 |
| 7,249,642 B2 * | 7/2007 | Tabata et al. | 180/65.275 |
| 7,318,787 B2 * | 1/2008 | Tabata et al. | 477/3 |
| 7,503,870 B2 * | 3/2009 | Tabata et al. | 477/3 |
| 7,566,288 B2 * | 7/2009 | Tabata et al. | 477/4 |
| 7,610,976 B2 * | 11/2009 | Holmes et al. | 180/65.29 |
| 7,618,343 B2 * | 11/2009 | Tabata et al. | 477/3 |
| 7,734,401 B2 * | 6/2010 | Joe et al. | 701/54 |
| 7,753,818 B2 * | 7/2010 | Kamada et al. | 475/153 |

(Continued)

FOREIGN PATENT DOCUMENTS

JP  A-2003-254110  9/2003

(Continued)

OTHER PUBLICATIONS

Office Action issued in Japanese Patent Appln. No. 2007-101184; mailed Jan. 10, 2012, with partial translation.

*Primary Examiner* — J. Allen Shriver, II
*Assistant Examiner* — James M Dolak
(74) *Attorney, Agent, or Firm* — Oliff & Berridge, PLC

(57) ABSTRACT

A control apparatus for a vehicular drive system including (a) an electrically controlled differential portion having a differential mechanism and operable to control a differential state between its input and output speeds by controlling an operating state of an electric motor connected to a rotary element of the differential mechanism, and (b) a transmission portion which constitutes a part of a power transmitting path between the electrically controlled differential portion and a drive wheel of a vehicle, the control apparatus including a non-iso-power shifting control portion configured to implement a non-iso-power shifting control of the vehicular drive system (differential portion) when a required special shifting action of the transmission portion not according to a shifting boundary line map should be restricted.

21 Claims, 10 Drawing Sheets

U.S. PATENT DOCUMENTS

| | | | |
|---|---|---|---|
| 7,822,524 B2 * | 10/2010 | Tabata et al. | 701/53 |
| 7,935,015 B2 * | 5/2011 | Tabata et al. | 475/5 |
| 7,935,021 B2 * | 5/2011 | Tabata et al. | 477/5 |
| 7,935,022 B2 * | 5/2011 | Iwase et al. | 477/5 |
| 7,955,215 B2 * | 6/2011 | Shibata | 477/3 |
| 8,182,395 B2 * | 5/2012 | Jonsson | 477/107 |
| 2003/0078126 A1 * | 4/2003 | Holmes et al. | 475/5 |

FOREIGN PATENT DOCUMENTS

| | | |
|---|---|---|
| JP | A-2003-294130 | 10/2003 |
| JP | A-2005-127485 | 5/2005 |
| JP | A-2005-337491 | 12/2005 |

* cited by examiner

|  | C1 | C2 | B1 | B2 | B3 | SPEED RATIO | STEPPING RATIO |
|---|---|---|---|---|---|---|---|
| 1st | ○ |  |  |  | ○ | 3.357 | 1.54 |
| 2nd | ○ |  |  | ○ |  | 2.180 | 1.53 |
| 3rd | ○ |  | ○ |  |  | 1.424 | 1.42 |
| 4th | ○ | ○ |  |  |  | 1.000 | SPREAD 3.36 |
| R |  | ○ |  |  | ○ | 3.209 |  |
| N |  |  |  |  |  |  |  |

○ ENGAGED

CONTROL APPARATUS FOR VEHICULAR DRIVE SYSTEM

CROSS REFERENCE TO RELATED APPLICATION

The present application claims priority from Japanese Patent Application No. 2007-101184, which was filed on Apr. 6, 2007, the disclosure of which I herein incorporated by reference in its entirety.

BACKGROUND OF THE INVENTION

1. Field of the Invention

The present invention relates in general to a control apparatus for a vehicular drive system including an electrically controlled differential portion having a differential mechanism capable of performing a differential function, and a transmission portion disposed in a power transmitting path between the electrically controlled differential portion and a drive wheel of a vehicle, and more particularly to techniques for reducing a load of the vehicular drive system in a high-load operating condition.

2. Discussion of Prior Art

There is known a control apparatus for a vehicular drive system including (a) an electrically controlled differential portion having a differential mechanism and operable to control a differential state between its input and output speeds by controlling an operating state of an electric motor connected to a rotary element of the differential mechanism, and (b) a transmission portion which constitutes a part of a power transmitting path between the electrically controlled differential portion and a drive wheel of a vehicle and which functions as an automatic transmission. mechanism, and an electric motor which is connected to a rotary element of JP-2005-237491A discloses an example of a control apparatus for a vehicular drive system including (a) an engine, (b) and an electrically controlled differential portion having a first electric motor, a second electric motor, a power transmitting member, and a planetary gear set (differential mechanism) which includes a first rotary element connected to the engine, a second rotary element connected to the first electric motor and a third rotary element connected to the second electric motor, and which is arranged to distribute an output of the engine to the first electric motor and the power transmitting member, and (c) a transmission portion which constitutes a part of a power transmitting path between the power transmitting member and a drive wheel of a vehicle and which functions as a step-variable automatic transmission.

The control apparatus for the vehicular drive system disclosed in the above-identified publication is arranged to change or control a speed ratio of the electrically controlled differential portion, so as to reduce a stepping change of an overall speed ratio of the vehicular drive system due to a stepping change of a speed ratio of the transmission portion caused by a shifting action thereof, so that the overall speed ratio defined by the speed ratio of the electrically controlled differential portion and the speed ratio of the transmission portion is continuously changed, and so that a stepping change of the operating speed of the engine during the shifting action of the transmission portion. Thus, the vehicular drive system as a whole can function as a continuously variable transmission which performs a so-called "iso-power shifting" in which the operating state of the engine (represented by its speed and torque, for example) is held substantially constant during the shifting action of the transmission portion, so that the vehicle drive power sources such as the engine and the electric motor are operated with high efficiency.

In the vehicular drive system described above, the transmission portion is usually shifted according to a predetermined shifting map. In some running condition of the vehicle, however, a special shifting action of the transmission portion is required to reduce a load of the vehicular drive system, that is, to improve the operating efficiency of the vehicle drive power sources. For instance, the load of the vehicular drive system becomes high when the electric motor is operated in an operating condition of low efficiency, or when the transmission portion is placed in a low-efficiency gear position in which a comparatively large amount heat is generated. An increase of the load of the vehicular drive system tends to cause a temperature rise of the electric motor, and a rise of the temperature of a working fluid used to operate the transmission portion and lubricate and cool the various parts of the vehicular drive system such as the electric motor. In view of this drawback, the special shifting action of the transmission portion is required for the purpose of changing the operating condition of the electric motor for improved operating efficiency and reduced operating load, and reducing the load of the transmission portion to thereby reduce the amount of heat generation, in order to reduce the load of the vehicular drive system, so that the temperature rises of the electric motor and the working fluid.

Unlike the ordinary shifting action of the transmission portion performed according to the predetermined shifting map, the special shifting action of the transmission portion for the purpose of reducing the load of the vehicular drive system has a risk of an excessive rise of the rotating speeds of rotary elements of the vehicular drive system beyond a limit value, and consequent deterioration of the durability of the vehicular drive system. For example, a certain relationship between the input speed of the transmission portion and the operating speed of the engine after the special shifting action of the transmission portion may cause a rise of the operating speed of the electric motor determined by relative operating speeds of the rotary elements of the differential portion, resulting in deterioration of the durability of the electric motor, or may cause a rise of the rotating speed of a pinion gear of the differential mechanism (in other words, an increase of a difference between the engine speed and the input speed of the transmission portion), resulting in deterioration of the durability of the pinion gear (durability of its needle bearing and bushing).

Although it is desirable to perform the special shifting action of the transmission portion for reducing the temperature rises of the electric motor and the working fluid, it is required to limit the special shifting action that causes a rise of the rotating speeds of the rotary elements beyond the upper value. However, the limitation of the special shifting action leads to a failure to lower the temperatures of the electric motor and the working fluid, also giving rise to a risk of deterioration of the durability of the vehicular drive system.

SUMMARY OF THE INVENTION

The present invention was made in view of the background art discussed above. It is therefore an object of this invention to provide a control apparatus for a vehicular drive system, which control apparatus permits a special shifting action of the transmission portion that is limited so as to avoid an excessive rise of the rotating speeds of rotary elements of the vehicular drive system, and to assure efficient operations of the vehicle drive power sources.

The object indicated above can be achieved according to any one of the following modes of this invention, each of which is numbered like the appended claims and which depends from the other mode or modes, where appropriate, for easier understanding of technical features disclosed in the present application, and combinations of those features.

(1) A control apparatus for a vehicular drive system including (a) an electrically controlled differential portion having a differential mechanism and operable to control a differential state between its input and output speeds by controlling an operating state of an electric motor connected to a rotary element of the differential mechanism, and (b) a transmission portion which constitutes a part of a power transmitting path between the electrically controlled differential portion and a drive wheel of a vehicle, the control apparatus comprising a non-iso-power shifting control portion configured to implement a non-iso-power shifting control of the vehicular drive system when a required shifting action of the transmission portion should be restricted.

According to the hybrid vehicle drive system control apparatus according to the above-described mode (1) of the present invention, the non-iso-power shifting control of the vehicular drive system is implemented by the non-iso-power shifting control portion when the required shifting action of the transmission portion should be restricted. The non-iso-power shifting control implemented by the drive-power-source reducing portion 86 permits a vehicle drive power source such as the electric motor to be operated with high efficiency, while preventing an excessive rise of a rotating speeds of a rotary elements of the vehicular drive system, even in the condition in which the shifting action of the transmission portion required to be performed for reducing a load of the vehicular drive system should be restricted. Described more specifically, the non-iso-power shifting control not only prevents an excessive rise of the rotating speed of a rotary element of the vehicular drive system beyond a limit value, thereby improving the durability of the vehicular drive system, but also permits the electric motor to be operated with high efficiency, owing to the non-iso-power shifting control, even when the shifting action of the transmission portion required to be performed for reducing the load of the vehicular drive system and a rise of a temperature of the electric motor and a rise of a temperature of a working fluid used for the transmission portion.

(2) The control apparatus according to the above-described mode (1), wherein the vehicular drive system further includes a vehicle drive power source operatively connected to the electrically controlled differential portion, and the non-iso-power shifting control portion includes a drive-power-source output reducing portion configured to reduce an output of the vehicle drive power source when the required shifting action of the transmission portion should be restricted.

In the above-described mode (2), the durability of the vehicular drive system can be improved even when the shifting action of the transmission portion required to be performed for reducing the load of the vehicular drive system is restricted.

(3) The control apparatus according to the above-described mode (2), wherein the vehicle drive power source includes an engine connected to a rotary element of the differential mechanism, and the drive-power-source output reducing portion is configured to reduce an output of the engine.

In the above-described mode (3), the load of the vehicular drive system can be reduced even when the required shifting action is restricted. Where the electric motor receives a reaction force corresponding to the output of the engine, for example, a load of the electric motor can be reduced. Where at least a part of the output of the engine is transmitted to the transmission portion, a power loss at the transmission portion can be reduced.

(4) The control apparatus according to the above-described mode (2) or (3), wherein the vehicle drive power source includes a second electric motor which is provided in addition to the above 0 indicated electric motor provided as a first electric motor and which is operatively connected to the rotary element of the differential mechanism, and the drive-power-source output reducing portion is configured to reduce an output of the second electric motor.

In the above-described mode (4), the load of the vehicular drive system can be reduced even when the required shifting action of the transmission portion is restricted. Where at least a part of the output of the second electric motor is transmitted to the transmission portion, for example, a power loss at the transmission portion can be reduced.

(5) The control apparatus according to any one of the above-described modes (1)-(4), wherein the required shifting action of the transmission portion is a shifting action required to be performed for reducing a rise of a temperature of the above-indicated electric motor.

In the above-described mode (5), the temperature rise of the electric motor is reduced owing to the shifting action of the transmission portion, and the temperature of the electric motor is suitably lowered owing to the reduction of the output of the vehicle drive power source, even when the required shifting action of the transmission portion is restricted.

(6) The control apparatus according to any one of the above-described modes (1)-(5), wherein the required shifting action of the transmission portion is a shifting action required to be performed for reducing a rise of a temperature of a working fluid used for the transmission portion.

In the above-described mode (6), the temperature rise of the working fluid is reduced owing to the shifting action of the transmission portion, and the temperature of the working fluid is suitably lowered owing to the reduction of the output of the vehicle drive power source, even when the required shifting action of the transmission portion is restricted.

(7) The control apparatus according to any one of the above described modes (2)-(6), wherein the drive-power-source output reducing portion is configured to reduce the output of the vehicle drive power source at a rate which increases with an increase of a degree of requirement for performing the shifting action of the transmission portion.

In the above-described mode (7), the output of the vehicle drive power source can be suitably reduced to suitably reduce a rise of the temperatures of the electric motor and the working fluid for the transmission portion. Where the temperature of the electric motor or working fluid rapidly rises, or where a difference of the temperature with respect to an upper limit is relatively small, for example, the output of the vehicle drive power source is rapidly reduced to rapidly lower the temperature of the electric motor or working fluid.

(8) The control apparatus according to any one of the above-described modes (2)-(7), wherein the drive-power-source output reducing portion is configured to reduce the output of the vehicle drive power source by an amount which increases with an increase of a degree of requirement for performing the shifting action of the transmission portion.

In the above-described mode (8), the output of the vehicle drive power source can be suitably reduced to suitably reduce a rise of the temperatures of the electric motor and the working fluid for the transmission portion. Where the temperature of the electric motor or working fluid rapidly rises, or where a difference of the temperature with respect to an upper limit is relatively small, for example, the output of the vehicle drive power source is reduced by a relatively large amount to lower the temperature of the electric motor or working fluid by a relatively large amount.

(9) The control apparatus according to any one of the above-described modes (1)-(8), further comprising a special-shifting-action requirement determining portion configured to determine that a special shifting action of the transmission portion is required, when a rate of rise of at least one of temperatures of the electric motor and a working fluid used for the transmission portion is higher than a predetermined upper limit.

In the above-described mode (9), at least one of the temperatures of the electric motor and the working fluid the rate of rise of which is higher than the upper limit can be rapidly lowered by reducing the output of the vehicle drive power source by a relatively large amount.

(10) The control apparatus according to any one of the above-described modes (1)-(9), further comprising a special-shifting-action requirement determining portion configured to determine that a special shifting action of the transmission portion is required, when a difference of at least one of temperatures of the electric motor and a working fluid used for the transmission portion with respect to a predetermined upper limit is smaller than a predetermined threshold value.

In the above-described mode (10), at least one of the temperatures of the electric motor and the working fluid which is relatively close to the upper limit can be rapidly lowered by reducing the output of the vehicle drive power source by a relatively large amount.

(11) The control apparatus according to any one of the above-described modes (1)-(10), further comprising a shifting-action restriction determining portion configured to determine that the required shifting action of the transmission portion should be restricted, when a rotating speed of a rotary element of the vehicular drive system is higher than a predetermined limit value.

In the above-described mode (11), at least one of the temperatures of the electric motor and a working fluid used for the transmission portion, which is relatively high due to the excessively high rotating speed of the rotary element, can be rapidly lowered by reducing the output of the vehicle drive power source by a relatively large amount.

(12) The control apparatus according to the above-described mode (11), wherein the vehicular drive system has a plurality of rotary elements, and the shifting-action restriction determining portion determines that the required shifting action should be restricted, when at least one of rotating speeds of the plurality of rotary elements is higher than the predetermined limit value.

In the above-described mode (12), the rotating speed of at least one of the plurality of rotary elements of the vehicular drive system will not exceed the predetermined limit value when the load of the vehicular drive system is reduced under the control of the non-iso-power shifting control portion.

(13) The control apparatus according to the above-described mode (11), wherein the vehicular drive system has a plurality of rotary elements, and the shifting-action restriction determining portion determines that the required shifting action should be restricted, when a relative rotating speed of the plurality of rotary elements is higher than a predetermined upper limit.

In the above-described mode (13), the relative rotating speed of the plurality of rotary elements of the vehicular drive system will not exceed the predetermined upper limit when the load of the vehicular drive system is reduced under the control of the non-iso-power shifting control portion.

(14) The control apparatus according to the above-described mode (11), wherein the predetermined limit value is a value below which a rotating speed of the electric motor connected to the differential mechanism is not expected to exceed a permissible limit value.

In the above-described mode (14), the rotating speed of the electric motor will not exceed the permissible limit value when the load of the vehicular drive system is reduced under the control of the non-iso-power shifting control portion.

(15} The control apparatus according to the above-described mode (11), wherein the vehicle drive power source includes a second electric motor which is provided in addition to the above-indicated electric motor provided as a first electric motor and which is operatively connected to the rotary element of the differential mechanism, and the predetermined limit value is a value below which a rotating speed of the second electric motor is not expected to exceed a permissible limit value.

In the above-described mode (15), the rotating speed of the second electric motor will not exceed the permissible limit value when the load of the vehicular drive system is reduced under the control of the non0iso-power shifting control portion.

(16) The control apparatus according to the above-described mode (11), wherein the predetermined limit value is a value below which a relative rotating speed of a pinion gear of the differential mechanism is not expected to exceed a permissible limit value.

In the above-described mode (16), the relative rotating speed of the pinion gear of the differential mechanism will not exceed the permissible limit value when the load of the vehicular drive system is reduced under the control of the non-iso-power shifting control portion.

(17) The control apparatus according to the above-described mode (11), wherein the predetermined limit value is a value below which a rotating speed of an input-side rotary member of the transmission portion is not expected to exceed a permissible limit value.

In the above-described mode (16), the rotating speed of the input-side rotary member of the transmission portion will not exceed the permissible limit value when the load of the vehicular drive system is reduced under the control of the non-iso-power shifting control portion.

(18) The control apparatus according to any one of the above-described modes (1)-(17), wherein the electrically controlled differential portion is operable as a continuously variable transmission by controlling an operating state of said electric motor.

In the above-described mode (18), the electrically controlled differential portion and the transmission portion cooperate to constitute a continuously variable transmission capable of transmitting a vehicle drive torque at a continuously variable speed ratio. The electrically controlled differential portion, which is operable as an electrically controlled continuously variable transmission the speed ratio of which is continuously variable, may be operable as a step-variable transmission the speed ratio of which is variable in steps.

(19) The control apparatus according to any one of the above-described modes (1)-(18), wherein the transmission portion is a step-variable automatic transmission portion.

In the above-described mode (19), the temperature of a working fluid used for the step-variable automatic transmission portion can be rapidly lowered under the control of the non-iso-power shifting control portion.

(20) The control apparatus according to any one of the above-described modes (1)-(19), further including an engine and a power transmitting member, wherein the differential mechanism is a planetary gear set having a carrier connected to the engine, a sun gear connected to the first electric motor, and a ring gear connected to the power transmitting member.

In the above-described mode (20), the axial dimension of the differential mechanism can be reduced, and the differential mechanism consisting of a single planetary gear set can be simplified in construction.

(21) The control apparatus according to the above-described mode (20), wherein the planetary gear set is a single-pinion type planetary gear set.

In the above-described mode (21), the differential mechanism consisting of a single single-pinion type planetary gear set can be simplified in construction.

(22) The control apparatus according to any one of the above-described mode (1)-(21), wherein the vehicular drive system has an overall speed ratio which is defined by a speed ratio (gear ratio) of the transmission portion and a speed ratio of the electrically controlled differential portion.

In the above-described mode (22), the vehicle drive force can be obtained over a wide range of speed ratio, by changing the speed ratio of the transmission portion as well as the speed ratio of the differential portion.

(23) The control apparatus according to any one of the above-described modes (1)-(22), wherein the transmission portion is a step-variable automatic transmission.

In the above-described mode (22),

BRIEF DESCRIPTION OF THE DRAWINGS

The above and other objects, features, advantages, and technical and industrial significance of this invention will be better understood by reading the following detailed description of a preferred embodiment of the present invention, when considered in connection with the accompanying drawings, in which.

DETAILED DESCRIPTION OF THE PREFERRED EMBODIMENT

Figures 1, 2:
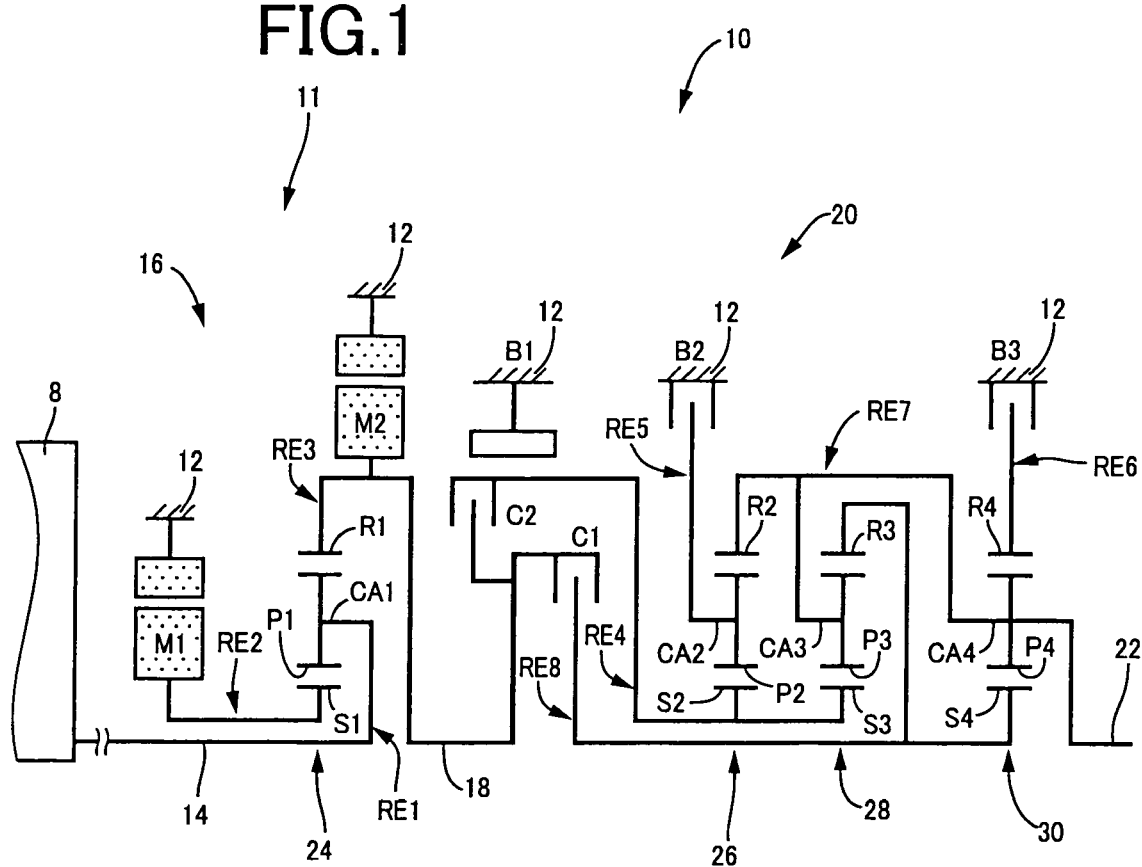
FIG. 1 is a schematic view showing an arrangement of a hybrid vehicle drive system which is controlled by a control apparatus constructed according to one embodiment of this invention.
FIG. 2 is a table indicating shifting actions of an automatic transmission portion provided in the hybrid vehicle drive system of FIG. 1, in relation to different combinations of operating states of hydraulically operated frictional coupling devices to effect the respective shifting actions.
Figure 7:
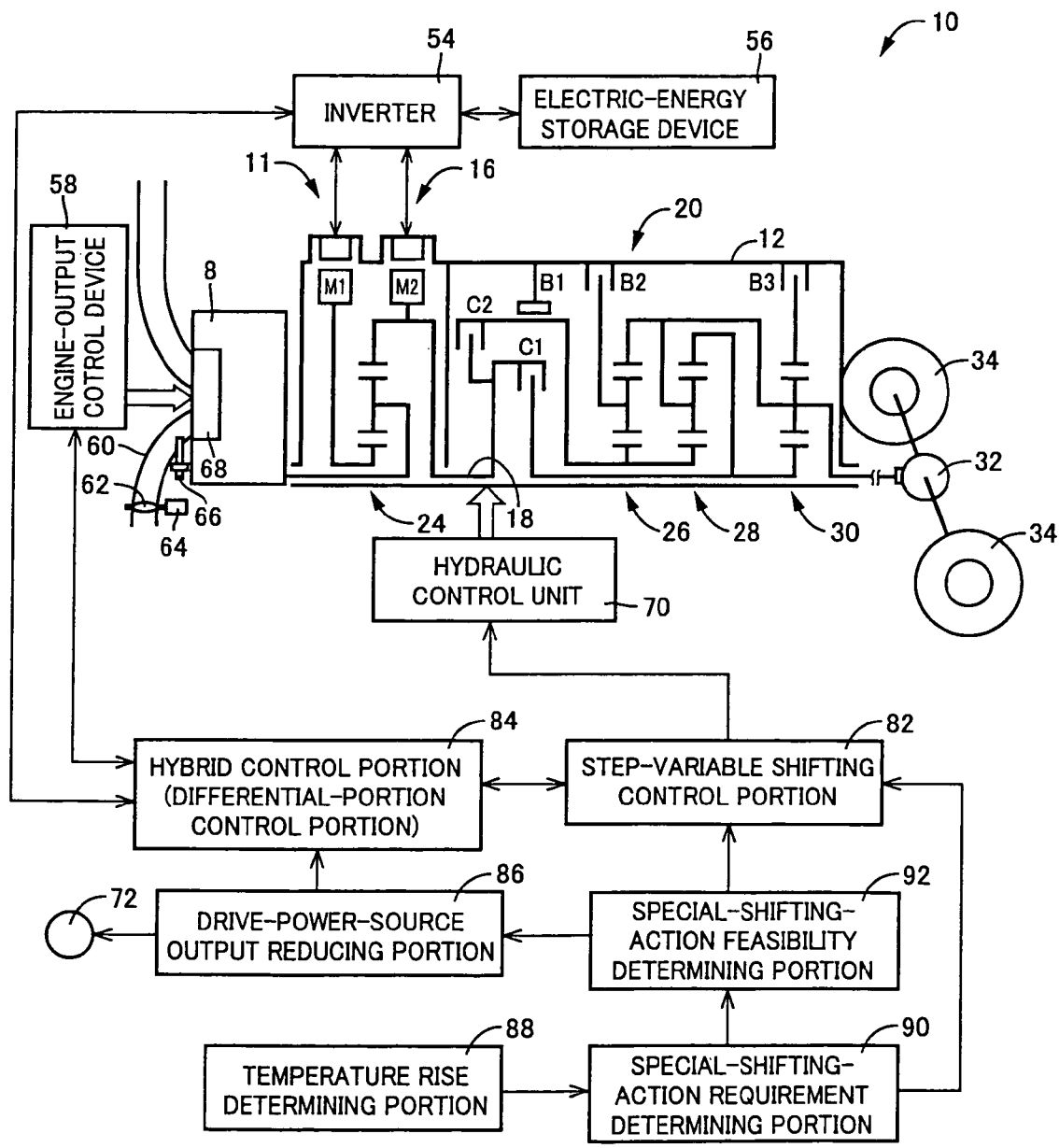
FIG. 7 is a functional block diagram illustrating major control functions of the electronic control device of FIG. 4.

Referring first to the schematic view of FIG. 1, there is shown a transmission mechanism 10 constituting a part of a drive system for a hybrid vehicle, which drive system is controlled by a control apparatus constructed according to one embodiment of this invention. As shown in FIG. 1, the transmission mechanism 10 includes: an input rotary member in the form of an input shaft 14; an electrically controlled transmission portion in the form of a differential portion 11 connected to the input shaft 14 either directly, or indirectly via a pulsation absorbing damper (vibration damping device) not shown; a power transmitting portion in the form of a hydraulic automatic transmission portion 20 disposed between the differential portion 11 and drive wheels 34 (shown in FIG. 7) of the hybrid vehicle, and connected in series via a power transmitting member 18 (power transmitting shaft) to the differential portion 11 and the drive wheels 34; and an output rotary member in the form of an output shaft 22 connected to the automatic transmission portion 20. The input shaft 12, differential portion 11, automatic transmission portion 20 and output shaft 22 are coaxially disposed on a common axis in a transmission casing 12 (hereinafter referred to simply as "casing 12") functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper.

In the present transmission mechanism 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. his is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is operatively connected to and rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as a major component, a first planetary gear set 24 of a single pinion type having a gear ratio ρ1 of about 0.418, for example. The first planetary gear set 24 has rotary elements consisting of a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The power distributing mechanism 16 constructed as described above is operated in a differential state in which three elements of the first planetary gear set 24 consisting of the first sun gear S1, first carrier CA1 and first ring gear R1 are rotatable relative to each other, so as to perform a differential function. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Thus, the differential portion 11 (power distributing mechanism 16) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio γ0 (rotating speed $N_{IN}$ of the input shaft 14/rotating speed $N_{18}$ of the power transmitting member 18) of the differential portion 11 is continuously changed from a minimum value γ0min to a maximum value γ0max, that is, in the continuously-variable shifting state in which the differential portion 11 functions as an electrically controlled continuously-variable transmission the speed ratio γ0 of which is continuously variable from the minimum value γ0min to the maximum value γ0max.

The automatic transmission portion 20 is a step-variable automatic transmission which constitutes a part of a power transmitting path between the differential portion 11 and the drive wheels 34. The automatic transmission portion 20 includes a single-pinion type second planetary gear set 26, a single-pinion type third planetary gear set 28 and a single-pinion type fourth planetary gear set 30. Thus, the automatic transmission portion 20 is a multiple-step transmission of a planetary gear type. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

Thus, the automatic transmission portion 20 and the differential portion 11 (power transmitting member 18) are selectively connected to each other through the first clutch C1 or the second clutch C2, which is provided to shift the automatic transmission portion 20. Accordingly, the output of the engine 8 is transited to the automatic transmission portion 20 through the differential portion 11, and the first clutch C1 and/or second clutch C2. The first clutch C1 and the second clutch C2 function as input clutches of the automatic transmission portion 20. When at least one of the first and second clutches C1 and C2 is placed in the engaged state, the power transmitting path between the power transmitting member 18 and the automatic transmission portion 20 is placed in a power transmitting state in which a vehicle drive force can be transmitted through the power transmitting path. When both of the first and second clutches C1, C2 are placed in the released state, the power transmitting path is placed in a power cut-off state in which the vehicle drive force cannot be transmitted through the power transmitting path.

The automatic transmission portion 20 is operable to perform a so-called "clutch-to-clutch" shifting action to establish a selected one of its operating positions (gear positions) by an engaging action of one of coupling devices and a releasing action of another coupling device. The above-indicated operating positions have respective speed ratios γ (rotating speed $N_{18}$ of the power transmitting member 18/rotating speed $N_{OUT}$ of the output shaft 22) which change as geometric series. As indicated in the table of FIG. 2, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the transmission mechanism 10 constructed as described above, the differential portion 11 functioning as the continuously-variable transmission and the automatic transmission portion 20 cooperate to constitute a continuously-variable transmission the speed ratio of which is continuously variable. While the differential portion 11 is controlled to hold its speed ratio constant, the differential portion 11 and the automatic transmission portion 20 cooperate to constitute a step-variable transmission the speed ratio of which is variable in steps.

When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting-member speed $N_{18}$") is continuously changed, so that the speed ratio of the hybrid vehicle drive system when the automatic transmission portion 20 is placed in the selected gear position M is continuously variable over a predetermined range. Accordingly, an overall speed ratio γT of the transmission mechanism 10 (rotating speed $N_{IN}$ of the input shaft 14/rotating speed $N_{OUT}$ of the output shaft 22) is continuously variable. Thus, the transmission mechanism 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the differential portion 11 functions as the continuously-variable transmission while the automatic transmission portion 20 is placed in a selected one of the first through fourth gear positions and reverse gear position as indicated in the table of FIG. 2. Accordingly, the overall speed ratio γT of the transmission mechanism 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the transmission mechanism 10 is variable in step as geometric series. Thus, the transmission mechanism 10 is operable like a step-variable transmission.

When the speed ratio γ0 of the differential portion 11 is held constant at 1, for example, the overall speed ratio γT of the transmission mechanism 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the transmission mechanism 10 is controlled to be about 0.7.

Figure 3:
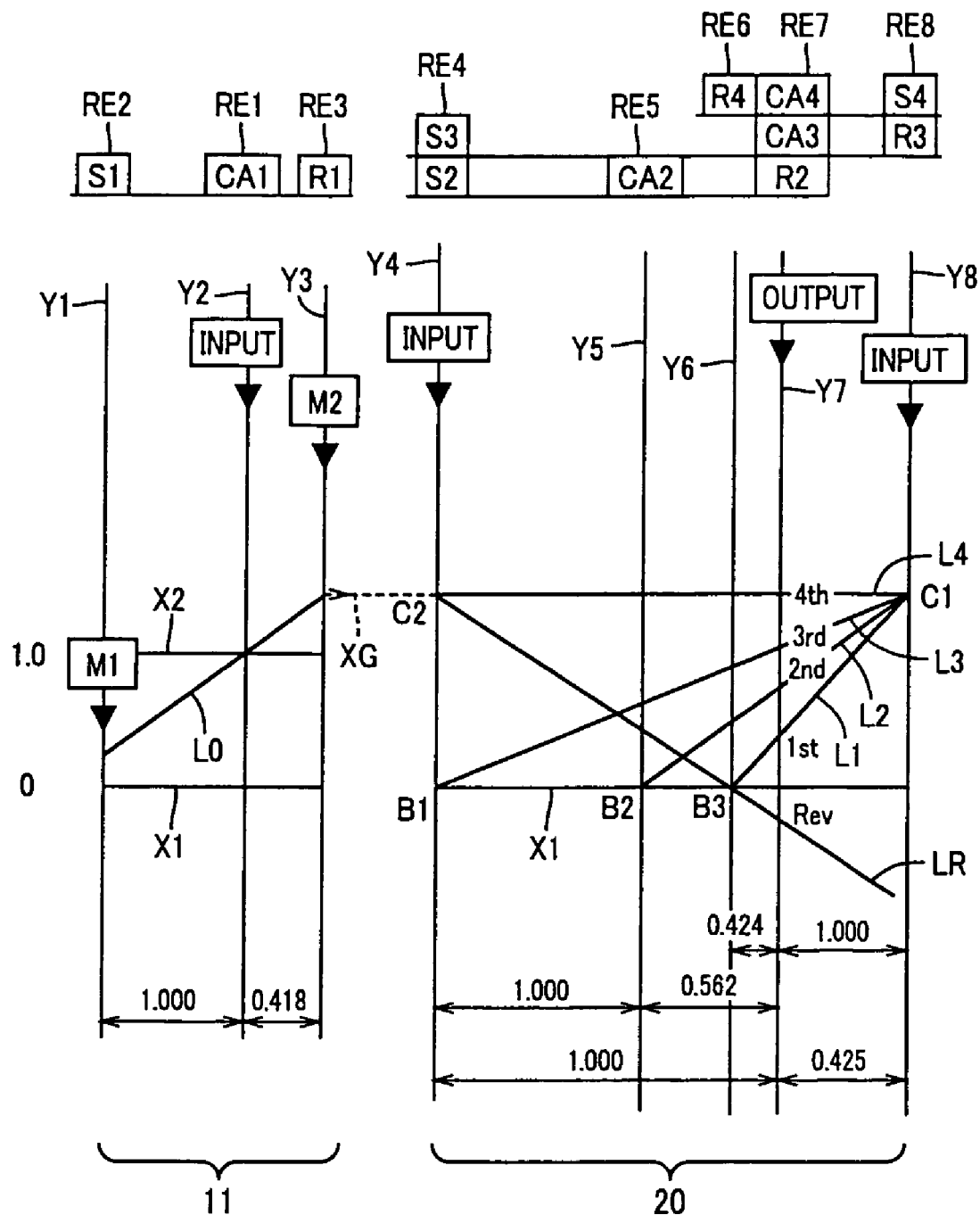
FIG. 3 is a collinear chart indicating relative rotating speeds of rotary elements of a differential portion and the automatic transmission portion of the hybrid vehicle drive system of FIG. 1.

The collinear chart of FIG. 3 indicates, by straight lines, a relationship among the rotating speeds of the rotary elements in each of the gear positions of the transmission mechanism 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8), and the second rotary element RE2 is fixed to the first electric motor M1, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the first sun gear S1, that is, the rotating speed of the first electric motor M1, which is represented by a point of intersection between the straight line L0 and the vertical line Y1, is raised or lowered by controlling the engine speed $N_E$, so that the rotating speed of the first carrier CA1 represented by a point of intersection between the straight line L0 and the vertical line Y2, if the rotating speed of the first ring gear R1 represented by a point of intersection between the straight line L0 and the vertical line Y3 is substantially held constant.

When the rotating speed of the first electric motor M1 is controlled such that the speed ratio γ0 of the differential portion 11 is held at 1, so that the rotating speed of the first sun gear S1 is made equal to the engine speed $N_E$, the straight line L0 is aligned with the horizontal line X2, so that the first ring gear R1, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the first sun gear S1 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed $N_E$ is input to the eighth rotary element RE8 of the automatic transmission portion 20. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 4:
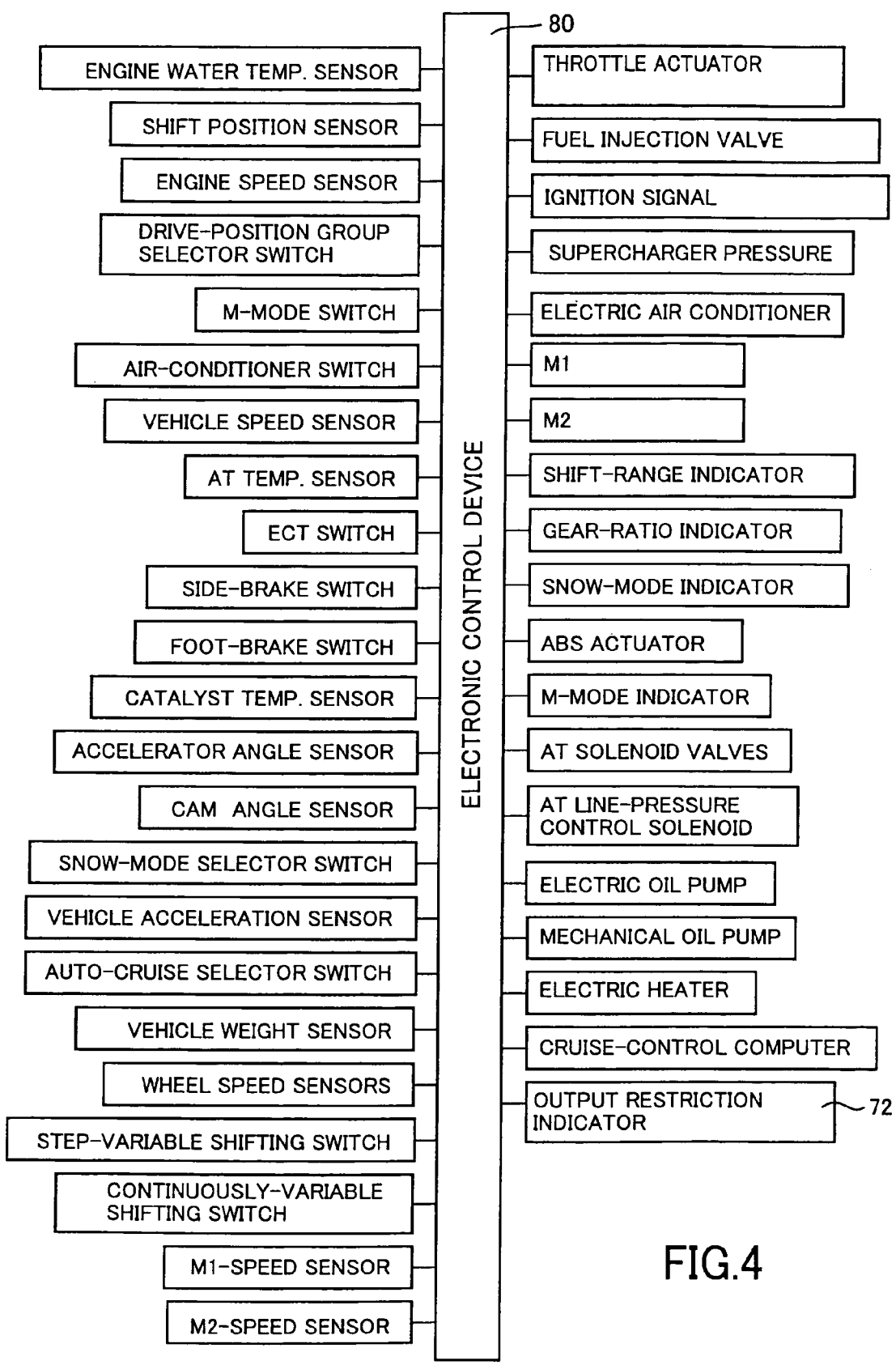
FIG. 4 is a view indicating input and output signals of an electronic control device serving as the control apparatus according to the embodiment of this invention to control the hybrid vehicle drive system of FIG. 1.

FIG. 4 illustrates signals received by an electronic control device 80 provided to control the transmission mechanism 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of operating positions $P_{SH}$ of a shift lever 52 (shown in FIG. 6); a signal indicative of the number of operations of the shift lever 52 from a manual forward-drive shifting position M (described below); a signal indicative of the operating speed $N_E$ of the engine 8; a signal indicative of a value indicating a selected group of forward-drive positions of the transmission mechanism 10; a signal indicative of an M mode (manual shifting mode); a signal indicative of an operated state of an air conditioner; a signal indicative of a vehicle speed V corresponding to the rotating speed $N_{OUT}$ of the output shaft 22

(hereinafter referred to as "output shaft speed"); a signal indicative of a temperature $TH_{ATF}$ of a working fluid or oil of the automatic transmission portion 20 (hereinafter referred to as "working fluid temperature $TH_{ATF}$"); a signal indicative of an operated state of a side brake; a signal indicative of an operated state of a foot brake; a signal indicative of a temperature of a catalyst; a signal indicative of a required amount of an output of the vehicle in the form of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of a rotating speed $N_{M1}$ of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); a signal indicative of a temperature $TH_{M1}$ of the first electric motor M1 (hereinafter referred to as "first electric motor temperature $TH_{M1}$"); a signal indicative of a temperature $TH_{M2}$ of the second electric motor M2 (hereinafter referred to as "second electric motor temperature $TH_{M2}$"); and a signal indicative of an amount of electric energy SOS stored in an electric-energy storage device 60 (shown in FIG. 7).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening $\theta_{TH}$ of an electronic throttle valve 62 disposed in an intake pipe 60 of the engine 8, a signal to control an amount of injection of a fuel by a fuel injecting device 66 into the intake pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves in the form of linear solenoid valves incorporated in a hydraulic control unit 70 (shown in FIG. 7) provided to control the hydraulic actuators of the hydraulically operated frictional coupling devices of the differential portion 11 and automatic transmission portion 20; a signal to operate a regulator valve incorporated in the hydraulic control unit 70, to regulate a line pressure PL; a signal to control an electrically operated oil pump which is hydraulic pressure source for generating a hydraulic pressure that is regulated to the line pressure PL; a signal to drive an electric heater; a signal to be applied to a cruise-control computer; and a signal to be applied to an output reduction indicator 72 which indicates that the output of the vehicle drive power source (hereinafter referred to as "drive power source output") is in the process of being limited or reduced, for example, the output (power) of the engine 8, and/or the output of the second electric motor M2 (hereinafter referred to as "second electric motor output") is/are in the process of being reduced.

Figure 5:
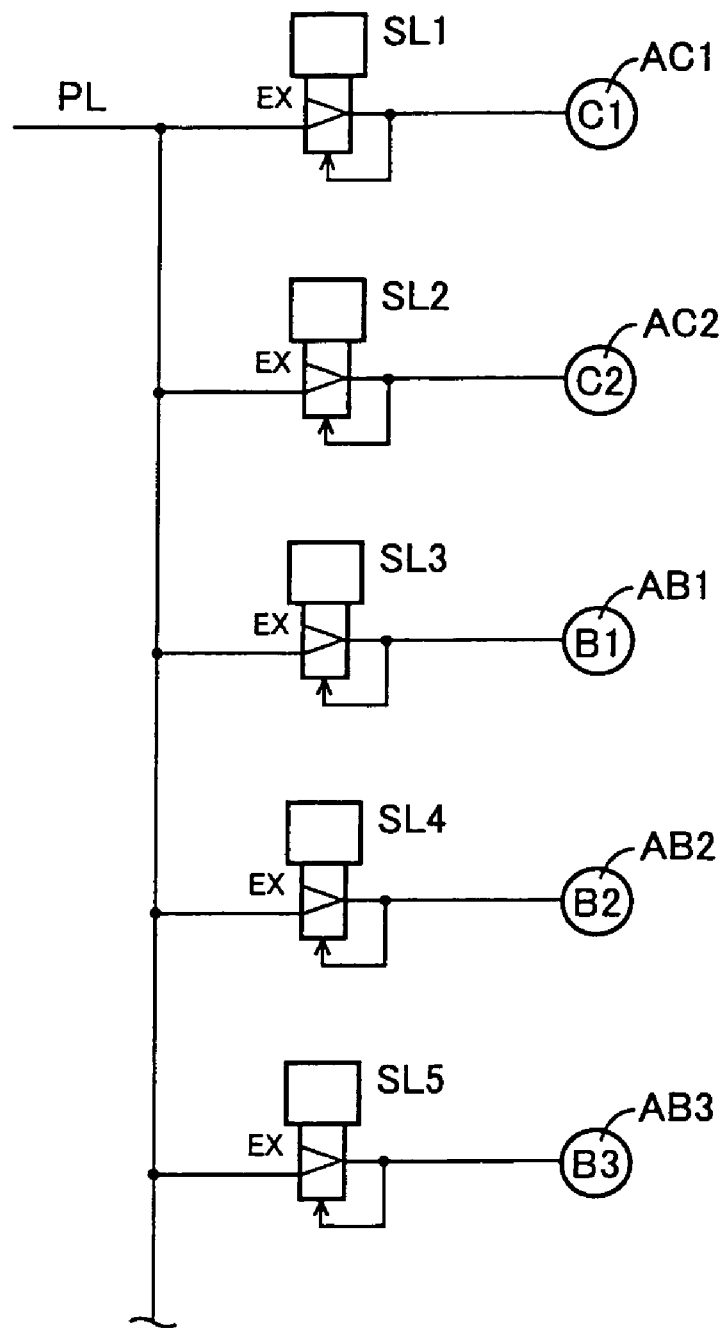
FIG. 5 is a circuit diagram showing hydraulic actuators provided in a hydraulic control unit, for operating clutches and brakes incorporated in the automatic transmission portion, and linear solenoid valves for controlling the hydraulic actuators.

FIG. 5 shows a hydraulic circuit of the hydraulic control unit 70 arranged to control linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by the mechanical oil pump 40 driven by the engine 8 or the electric oil pump 76 provided in addition to the mechanical oil pump 40, and which is regulated by a relief-type pressure regulator valve according to a load of the engine 8 as represented by the operation amount $A_{CC}$ of the accelerator pedal or the opening angle $\theta_{TH}$ of the electronic throttle valve 62, for example.

The linear solenoid valves SL1-SL5 have substantially the same construction, and are controlled independently of each other by the electronic control device 80, to adjust the hydraulic pressures of the hydraulic actuators AC, AC2, AB1, AB2, AB3 independently of each other, for controlling the engaging pressures PC1, PC2, PB1, PB2, PB3, so that the appropriate two coupling devices (C1, C2, B1, B2, B3) are engaged to shift the automatic transmission portion 20 to the selected operating position or gear position. A shifting action of the automatic transmission portion 20 from one position to another is a so-called "clutch-to-clutch" shifting action involving an engaging action of the coupling devices (C, B) and a releasing action another of the coupling devices, which take place concurrently.

Figure 6:
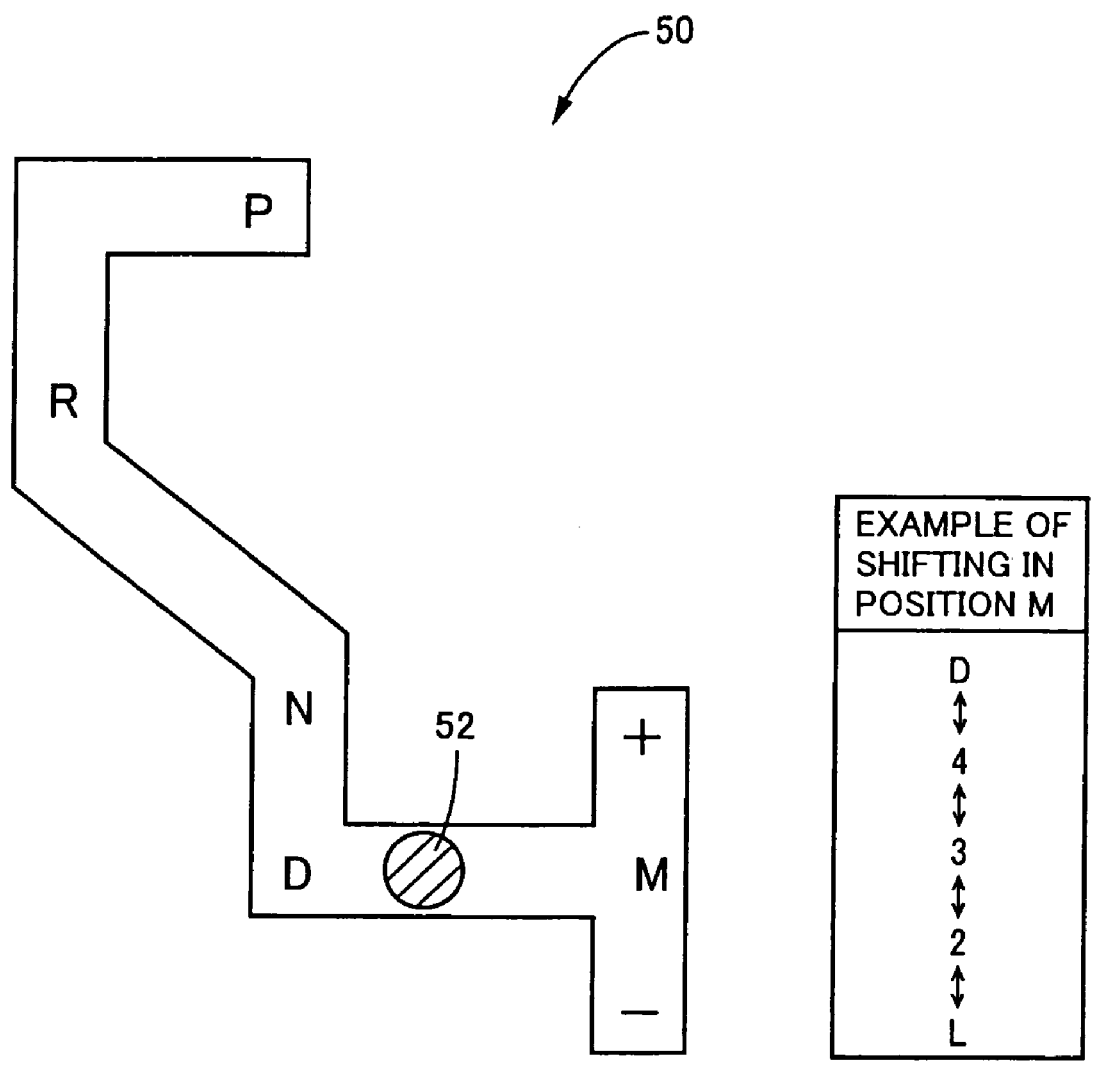
FIG. 6 is a view showing an example of a manually operated shifting device including a shift lever and operable to select one of a plurality of shift positions.

FIG. 6 shows an example of a manually operable shifting device in the form of a shifting device 50. The shifting device 50 includes the above-described shift lever 52, which is disposed laterally adjacent to an operator's seat of the vehicle, for example, and which is manually operated to select one of the plurality of operating positions $P_{SH}$.

The operating positions $P_{SH}$ of the shift lever 52 consists of a parking position P for placing the drive system 10 (namely, automatic transmission portion 20) in a neutral state in which a power transmitting path through the automatic transmission portion 20 is disconnected while at the same time the output shaft 22 is placed in the locked state; a reverse-drive position R for driving the vehicle in the rearward direction; a neutral position N for placing the drive system 10 in the neutral state; an automatic forward-drive shifting position D for establishing an automatic shifting mode; and the above-indicated manual forward-drive shifting position M for establishing a manual shifting mode. In the automatic shifting mode, the overall speed ratio $\gamma T$ is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the operating positions $P_{SH}$, the hydraulic control unit 70 is electrically operated to switch the hydraulic circuit to establish the rear-drive position R, neutral position N, and one of the forward-drive first through fourth gear positions, as indicated in the table of FIG. 2.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 52 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 52 from the neutral position N to the automatic forward-drive position D causes at least the first clutch C1 to be engaged for switching the power transmitting path in the automatic transmission portion 20 from the power-cut-off state to the power-transmitting state. A manual operation of the shift lever 52 from the rear-drive position R to the parking position P or neutral position N cause the second clutch C2 to be released for switching the power transmitting path in the automatic transmission portion 20 from the power-transmitting state to the power-cut-off state. A manual operation of the shift lever 52 from the automatic forward-drive position D to the neutral position N causes the first clutch C1 and the second clutch C2 to be released for switching the power transmitting path from the power-transmitting state to the power-cut-off state.

Referring to the functional block diagram of FIG. 7, the electronic control device 80 includes a step-variable shifting control portion 82, a hybrid control portion 84, a drive-power-source output reducing portion 86, a temperature-rise determining portion 88, a special-shifting-action requirement determining portion 90, and a special-shifting-action feasibility determining portion 92. The step-variable shifting control portion 82 is configured to determine whether a shifting action of the automatic transmission portion 20 should take place, that is, to determine the gear position to which the automatic transmission portion 20 should be shifted. This determination is made on the basis of a condition of the vehicle represented by the vehicle speed V and a required output torque $T_{OUT}$ of the automatic transmission portion 20, and according to a stored shifting boundary line map (shifting control map or relation) which represents shift-up boundary lines indicated by solid lines in FIG. 8 and shift-down boundary lines indicated by one-dot chain lines in FIG. 8.

The step-variable shifting control portion 82 generates a shifting command (hydraulic control command) to be applied to the hydraulic control unit 70, to engage and release the appropriate two hydraulically operated frictional coupling devices (C1, C2, B1, B2, B3), for establishing the determined gear position of the automatic transmission portion 20 according to the table of FIG. 2. Described in detail, the step-variable shifting control portion 82 commands the hydraulic control unit 70 to control the appropriate two linear solenoid valves SL incorporated in the hydraulic control unit 70, for activating the appropriate hydraulic actuators of the appropriate two frictional coupling devices (C, B) to concurrently engage one of the two frictional coupling devices and release the other frictional coupling device, to effect the clutch-to-clutch shifting action of the automatic transmission portion 20 to the determined gear position.

The hybrid control portion 84, which functions as a differential portion control portion, controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electric continuously-variable transmission. For instance, the hybrid control portion 84 calculates a target (required) vehicle output at the present running speed V of the vehicle, on the basis of the operation amount $A_{CC}$ of the accelerator pedal used as an operator's required vehicle output and the vehicle running speed V, and calculate a target total vehicle output on the basis of the calculated target vehicle output and a required amount of generation of an electric energy by the first electric motor M1. The hybrid control portion 84 calculates a target output of the engine 8 to obtain the calculated target total vehicle output, while taking account of a power transmission loss, a load acting on various devices of the vehicle, an assisting torque generated by the second electric motor M2, etc. The hybrid control portion 84 controls the speed $N_E$ and torque $T_E$ of the engine 8, so as to obtain the calculated target engine output, and the amount of generation of the electric energy by the first electric motor M1.

The hybrid control portion 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20. That is, the hybrid control portion 82 determines a target value of the overall speed ratio γT of the transmission mechanism 10, so that the engine 8 is operated according to a stored highest-fuel-economy curve (fuel-economy map or relation) indicated by broken line in FIG. 9. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 82 controls the speed ratio γ0 of the differential portion 11, so as to obtain the target value of the overall speed ratio γT, so that the overall speed ratio γT can be controlled within a predetermined range.

In the hybrid control, the hybrid control portion 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

When a shifting action of the automatic transmission portion 20 is performed under the control of the step-variable shifting control portion 82, the overall speed ratio γT of the transmission mechanism 10 is changed in steps due to a stepping change of the speed ratio of the automatic transmission portion 20 during its shifting action. A change of the overall speed ratio γT in steps rather than continuously, namely, a stepping change of the overall speed ratio γT permits a more rapid change of the overall speed ratio γT, but on the other hand may cause a shifting shock of the transmission mechanism 10, or a failure to control the engine speed NE following the highest fuel-economy curve and consequent reduction of the fuel economy.

In view of the potential drawback indicated above, the hybrid control portion 84 is configured to control the speed ratio of the differential portion 11 in synchronization with a shifting action of the automatic transmission portion 20, such that the speed ratio of the differential portion 11 changes in a direction opposite to a direction of the stepping change of the speed ratio of the automatic transmission portion 20, for thereby reducing the stepping change of the overall speed ratio γT. In other words, the hybrid control portion 84 is configured to implement a shifting control of the differential portion 11 in synchronization with the shifting action of the automatic transmission portion 20, such that the overall speed ratio γT of the transmission mechanism 10 changes continuously during the shifting action of the automatic transmission portion 20. For instance, the hybrid control portion 84 implements the shifting control of the differential portion 11 in synchronization with the shifting action of the automatic transmission portion 20, such that the speed ratio of the differential portion 11 changes in steps in the direction opposite to the direction of the stepping change of the speed ratio of the automatic transmission portion 20, by an amount equal to an amount of the stepping change of the automatic transmission portion 20 for thereby preventing a transient stepping change of the overall speed ratio γT of the transmission mechanism 10 during the shifting action of the automatic transmission portion 20.

Figure 8:
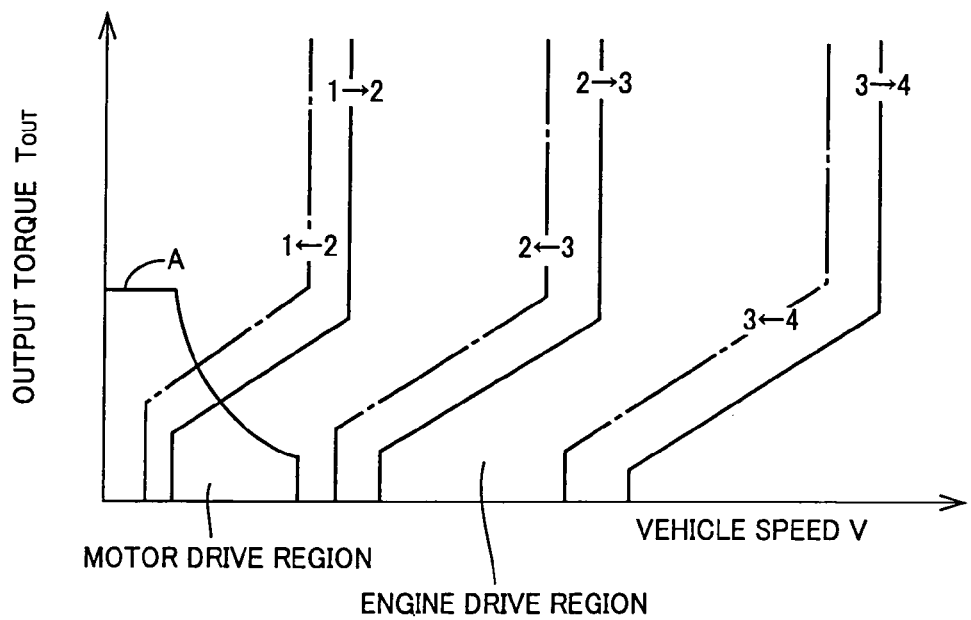
FIG. 8 is a view illustrating an example of a stored shifting boundary line map used for determining a shifting action of the automatic transmission portion, and an example of a stored drive-power-source switching boundary line map defining boundary lines between an engine drive region and a motor drive region for switching between an engine drive mode and a motor drive mode.

In other words, the hybrid control portion 84 is configured to control the speed ratio γ0 of the differential portion 11 such that the operating state of the engine 8 does not change during a shifting action of the automatic transmission portion 20, irrespective of a stepping change of the automatic transmission portion 20 during its shifting action. FIG. 8 indicates iso-power curves P1, P2 and P3 of the engine 8, by way of example. In FIG. 8, a point A represents the operating state of the engine 8 as represented by the engine speed $N_E$ and engine torque $T_E$, at which the required engine output P2 is obtained with the highest fuel economy. The hybrid control portion 84 is arranged to implement a so called "iso-power shifting control" of the differential portion 11 such that the operating state of the engine 8 as represented by the point A for example does not change during the shifting action of the automatic transmission portion 20, or follows the highest fuel-economy curve and the iso-power curve. Described more specifically, the hybrid control portion 84 controls the throttle actuator 64 so as to keep the engine torque $T_E$ substantially constant during the shifting action of the automatic transmission portion 20, and controls the first electric motor speed $N_{M1}$ in a direction opposite to a direction of change of the second electric motor speed $N_{M2}$ due to the shifting action, for thereby keeping the engine speed $N_E$ substantially constant.

The hybrid control portion 84 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control portion 84 is capable of controlling the first electric motor speed $N_{M1}$ as desired while holding the engine speed $N_E$ substantially constant or at a desired value. For example, the hybrid control portion 84 raises the engine speed $N_E$ by raising the first electric motor speed $N_{M1}$ during running of the vehicle while the second electric motor speed $N_{M2}$ determined by the vehicle running speed V (rotating speed of the drive wheels 34) is held substantially constant, as is apparent from the collinear chart of FIG. 3.

The hybrid control portion 84 includes engine output control means functioning to command the engine-output control device 58 for controlling the engine 8, so as to provide a required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination.

For instance, the hybrid control portion 84 is basically arranged to control the throttle actuator 64 on the basis of the operation amount $A_{CC}$ of the accelerator pedal and according to a predetermined stored relationship (not shown) between the operation amount $A_{CC}$ and the opening angle $\theta_{TH}$ of the electronic throttle valve 62 such that the opening angle $\theta_{TH}$ increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control portion 84.

The hybrid control portion 84 is capable of establishing a motor-drive mode to drive the vehicle by the electric motor, by utilizing the electric CVT function (differential function) of the differential portion 11, irrespective of whether the engine 8 is in the non-operated state or in the idling state.

For example, the hybrid control portion 84 is configured to determine whether the vehicle running condition represented by the actual vehicle running speed V and the required output torque $T_{OUT}$ of the automatic transmission portion 20 is in a motor-drive region in which the second electric motor M2 is used as the vehicle drive power source, or in an engine-drive region in which the engine 8 is used as the vehicle drive power source. This determination is made on the basis of the actual vehicle running speed V and the required output torque $T_{OUT}$ of the automatic transmission portion 20, and according to a predetermined drive-power-source switching boundary line map, which is stored in a memory together with the shift-up boundary lines and shift-down boundary lines that are indicated in by solid lines and one-dot chain lines, respectively. Solid line A indicated in FIG. 8 represents an example of a drive-power-source switching boundary line which defines the motor-drive region and the engine-drive region. As is understood from FIG. 8, the hybrid control portion 84 establishes the motor-drive mode when the output torque $T_{OUT}$ is in a comparatively low range in which the engine operating efficiency is comparatively low, namely, when the engine torque $T_E$ is in a comparatively low range, or when the vehicle speed V is in a comparatively low that is, when the vehicle load is comparatively low.

For reducing a dragging of the engine 8 in its non-operated state and improving the fuel economy in the motor-drive mode, the hybrid control portion 84 is configured to hold the engine speed $N_E$ at zero or substantially zero as needed, owing to the electric CVT function (differential function) of the differential portion 11, that is, by controlling the differential portion 11 to perform its electric CVT function, so that the first electric motor speed $N_{M1}$ is controlled to be in a non-load state, so as to be freely rotated to have a negative speed $N_{M1}$.

The hybrid control portion 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34.

The hybrid control portion 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control portion 84 is arranged to place the first electric motor M1 in the non-load state, for thereby placing the differential portion 11 in a neutral state in which the power transmitting path is electrically cut off.

The shifting boundary line map indicated in FIG. 8 by way of example is determined so as to prevent a rise of the rotating speeds of the rotary elements of the transmission mechanism 10 beyond a limit value, while taking account of the rotating speeds of the rotary elements of the differential portion 11 and the rotating speed of an input-side rotary member of the automatic transmission portion 20.

For instance, the shift-up boundary lines and the shift-down boundary lines of the shifting boundary line map are determined to selectively establish the gear positions (speed ratios) of the automatic transmission portion 20, so as to prevent an excessive rise of the first electric motor speed $N_{M1}$ (beyond a positive limit value of +10,000 rpm in the forward direction or a negative limit value of −10,000 rpm in the reverse direction, for example) to prevent deterioration of the durability of the first electric motor M1. For example, the shift-up and shift-down boundary lines are determined to prevent an excessive rise of the first electric motor speed $N_{M1}$ which is determined by the relationship among the transmitting-member speed $N_{18}$ (output shaft speed $N_{OUT}$×speed ratio γ), engine speed $N_E$ and first electric motor speed $N_{M1}$ that are received by the differential portion 11. Alternatively, the shift-up and shift-down boundary lines are determined to prevent an excessive rise of the second electric motor speed $N_{M2}$ equal to the transmitting-member speed $N_{18}$, for preventing deterioration of the durability of the second electric motor M2. Further alternatively, the shift-up and shift-down boundary lines are determined to prevent an excessive rise of the input speed of the automatic transmission portion 20 equivalent to the transmitting-member speed $N_{18}$, for preventing deterioration of the durability of the automatic transmission 20 (for example, the durability of the first clutch C1). Further alternatively, the shift-up and shift-down boundary lines are determined to prevent an excessive rise of a rotating speed $N_{P1}$ of the pinion gear or first planetary gear P1 of the first planetary gear set 24 of the power distributing mechanism 16, for preventing deterioration of the durability of the first planetary gear P1 (for example, the durability of the needle bearing through which the pinion shaft is inserted for the first carrier CA1 to support the first planetary gear P1 such that the first planetary gear P1 is rotatable about its axis and about the axis of the first sun gear S1). That is, the shift-up and shift-down boundary lines are determined to prevent an excessive difference $\Delta N_{P1}$ between the transmitting-member speed $N_{18}$ (which determines the rotating speed $N_{P1}$ of the first planetary gear P1) or the rotating speed of the first ring gear R1, and the engine speed $N_E$ or the rotating speed of the first carrier CA1). It is noted that the first planetary gear speed NP1 increases with an increase of the speed difference $\Delta N_{P1}$.

In the gear position of the automatic transmission portion 20 which is established or selected according to the shifting boundary line map determined as described above, however, the first electric motor M1 and/or the second electric motor M2 is/are not necessarily operated with high efficiency, and the power transmitting efficiency of the automatic transmission portion 20 is not necessarily high. Accordingly, the loads acting on the first electric motor M1 and/or the second electric motor M2 and the automatic transmission portion 20 may be excessively high, resulting in a risk of an excessive rise of the temperature of the first electric motor M1 and/or the second electric motor M2 (for example, an excessive rise of the temperature of the coil or rotor), and/or an excessive rise of the temperature of the working fluid used to lubricate and cool the first and second electric motors M1, M2 and automatic transmission portion 20, whereby the durability of the transmission mechanism 10 including the first and second electric motors M1, M2 and the automatic transmission portion 20 may be deteriorated.

Therefore, the automatic transmission portion 20 is required to perform a special shifting action not according to the shifting boundary line map, for reducing the load of the transmission mechanism 10 due to the comparatively high load of the first electric motor M1 and the second electric motor M2 or the comparatively high load of the automatic transmission portion 20, which cause the above-indicated temperature rise. That is, for reducing the temperature rise, the special shifting action of the automatic transmission portion 20 is required to change the operating state of the first electric motor M1 and/or the second electric motor M2 to a more efficient state, for thereby reducing the load of the first electric motor M1 and/or the second electric motor M2, and to improve the power transmitting efficiency and reduce the temperature rise and load of the automatic transmission portion 20.

The above-indicated iso-power shifting control of the differential portion 11 under the control of the hybrid control portion 84 in synchronization with the special shifting action of the automatic transmission portion 20 not according to the shifting boundary line map determined so as to prevent an excessive rise of the rotating speeds of the rotary elements of the transmission mechanism 10 may cause an excessive rise of the operating speed of the first electric motor M1, an excessive rise of the operating speed of the second electric motor M2 (rotating speed of the power transmitting member 18 or an input-side rotary member of the automatic transmission portion 20, depending upon the gear position of the automatic transmission portion 20 established by the special shifting action.

For instance, the iso-power shifting control of the differential portion 11 together with a special shift-up action of the automatic transmission portion 20 which increases the first electric motor speed $N_{M1}$ may cause an excessive rise of the first electric motor speed $N_{M1}$ beyond a positive limit value, when the engine speed $N_E$ is comparatively higher than the output shaft speed $N_{OUT}$.

For instance, the iso-power shifting control of the differential portion together with a special shift-down action of the automatic transmission portion 20 which reduces the first electric motor speed $N_{M1}$ may cause an excessive rise of the first electric motor speed $N_{M1}$ beyond a negative limit value, when the engine speed $N_E$ is comparatively lower than the output shaft speed $N_{OUT}$.

For instance, the iso-power shifting control of the differential portion 11 together with a special shift-down action of the automatic transmission portion 20 which increases the second electric motor speed $N_{M2}$ may cause an excessive rise of the second electric motor speed $N_{M2}$ beyond a limit value, when the output shaft speed $N_{OUT}$ and the second electric motor speed $N_{M2}$ are high.

For instance, the iso-power shifting control of the differential portion 11 together with a special shift-up action of the automatic transmission portion 20 which increases the first planetary gear speed $N_{P1}$ (the speed difference $\Delta N_{P1}$) may cause an excessive rise of the first planetary gear speed $N_{P1}$ beyond a limit value, when the engine speed $N_E$ is comparatively higher than the output shaft speed $N_{OUT}$. The iso-power shifting control of the differential portion 11 in synchronization with a special shift-down action of the automatic transmission portion 20 which increases the first planetary gear speed $N_P1$ may also cause the excessive rise of the first planetary gear speed $N_{P1}$, when the engine speed $N_E$ is comparatively lower than the output shaft speed $N_{OUT}$.

If the special shifting action of the automatic transmission portion 20 to prevent the excessive rise of the rotating speeds of the rotary elements of the transmission mechanism 10 was limited or inhibited, it would not be possible to prevent an excessive rise of the first electric motor temperature $TH_{M1}$, second electric motor temperature $TH_{M2}$ and working fluid temperature $TH_{ATF}$, so that the durability of the transmission mechanism 10 would be deteriorated.

The vehicular drive system control apparatus in the form of the electronic control device 80 according to the present embodiment includes the above-indicated drive-power-source output reducing portion 86, in view of the excessive rise of the rotating speeds of the rotary elements of the transmission mechanism 10 due to the iso-power shifting control of the differential portion 11 under the control of the hybrid control portion 84 in synchronization with the special shifting action of the automatic transmission portion 20 under the control of the step-variable shifting control portion 82 to reduce the load of the transmission mechanism 10. The drive-power-source output reducing portion 86 is configured to implement a non-iso-power shifting control of the transmission mechanism 10 so as to prevent an excessive rise of the rotating speeds of the rotary elements and to operate the first or second electric motor M1, M2 with high efficiency, and to limit or reduce the output of the vehicle drive power source for reducing the load of the transmission mechanism 10, rather than to implement a special shifting action of the automatic transmission portion 20. Thus, the drive-power-source output reducing portion 86 functions as a non-iso-power shifting control portion configured to implement a non-iso-power shifting control of the transmission mechanism 10 when a required special shifting action of the automatic transmission portion 20 should be restricted or limited to prevent an excessive rise of a rotary element of the transmission mechanism 10.

The iso-power shifting control of the differential portion 11 is desirable to improve the fuel economy and drivability of the vehicle, upon a special shifting action of the automatic transmission portion 20 for reducing the load of the transmission mechanism 10, for example, for reducing a temperature rise of the first electric motor M1 and/or the second electric motor M2, and a rise of the working fluid temperature $TH_{ATF}$. Where the iso-power shifting control of the differential portion 11 in synchronization with the special shifting action of the automatic transmission portion 20 causes an excessive rise of the rotating speeds of the rotary elements of the transmission mechanism 10, however, the durability of the transmission mechanism 10 is more important than the fuel economy and drivability of the vehicle. In this case, therefore, the drive-power-source output reducing portion 86 reduces the output of the drive power source rather than limiting or inhibiting the special shifting action of the automatic transmission portion 20, to reduce the load of the transmission mechanism 10.

Considered from another point of view, the hybrid control portion 84 functions as a first load reducing portion configured to reduce the load of the transmission mechanism 10 by implementing an iso-power shifting control of the differential portion 11 in synchronization with a shifting action of the automatic transmission portion 20 under the control of the step-variable shifting control portion 82, while the drive-power-source output reducing portion 86 functions as a second load reducing portion configured to reduce the load of the transmission mechanism 10 by reducing the output of the drive power source if the iso-power shifting control of the differential portion 11 under the control of the hybrid control portion 84 causes a rise of the rotating speeds of the rotary elements of the transmission mechanism 10 beyond the limit value. The first load reducing portion does not inhibit the shifting action of the automatic transmission portion 20 which is effective to assure an efficient operation of the first electric motor M1 and/or second electric motor M2, and a high power transmitting efficiency of the automatic transmission portion 20, for thereby reducing the load of the transmission mechanism 10. On the other hand, the second load reducing portion in the form of the drive-power-source output reducing portion 86 reduces the output of the first electric motor M1 and/or the output of the second electric motor M2, and reduces the drive power input to the automatic transmission portion 20, for thereby reducing the load of the transmission mechanism 10.

Described in detail, the above-indicated temperature rise determining portion 88 is provided to determine whether at least one of the first electric motor temperature $TH_{M1}$, second electric motor temperature $TH_{M2}$ and working fluid temperature $TH_{ATF}$ is excessively higher, that is, higher than a predetermined upper limit. The upper limits of the temperatures $TH_{M1}$, $TH_{M2}$, $TH_{ATF}$ are lower by a suitable amount than critical temperature values which are obtained by experimentation and above which the durability of the transmission mechanism 10 is deteriorated if it is kept operated for a long time at those critical temperature values or higher.

The special-shifting-action requirement determining portion 90 is operated when the temperature-rise determining portion 88 has determined that at least one of the first electric motor speed $TH_{M1}$, second electric motor speed $TH_{M2}$ and working fluid temperature $TH_{ATF}$ is higher than the upper limit. The special-shifting-action requirement determining portion 90 is configured to determine whether the automatic transmission portion 20 placed in the gear position selected according to the shifting boundary line map of FIG. 8 by the step-variable shifting control portion 82 is required to perform a special shifting action for lowering the temperatures $TH_{M1}$, $TH_{M2}$, $TH_{ATF}$ below the upper limits. Namely, the special-shifting-action requirement determining portion 90 determines whether a special shift-up or shift-down action of the automatic transmission portion 20 is required for reducing or preventing the rises of the temperatures $TH_{M1}$, $TH_{M2}$, $TH_{ATF}$. For instance, the special shift-up and shift-down actions to be performed as a result of an affirmative determination by the special-shifting-action requirement determining portion 90 are shifting actions which are obtained by experimentation and which are effective to improve the operating efficiency of the first electric motor M1 and/or second electric motor M2 and the power transmitting efficiency of the automatic transmission portion 20. The determination as to whether the special shift-up or shift-down action is required is made by determining whether the rate of increase of at least one of the temperatures $TH_{M1}$, $TH_{M2}$, $TH_{ATF}$ is higher than a predetermined upper limit, or whether at least one of the temperatures $TH_{M1}$, $TH_{M2}$, $TH_{ATF}$ is in the process of being raised and a difference of the at least one temperature $TH_{M1}$, $TH_{M2}$, $TH_{ATF}$ with respect to the upper limit is smaller than a predetermined threshold value. The special-shifting-action requirement determining portion 90 is operated also when the rate of rise of at least one of the temperatures $TH_{M1}$, $TH_{M2}$, $TH_{ATF}$ is higher than the upper limit or when the rotating speed of at least one of the three rotary elements of the differential portion 11 is higher than a predetermined upper limit. When the shifting requirement determining portion 90 is operated in this case, the determination is made as to whether the special shift-up or shift-down action of the automatic transmission portion 20 is required for lowering the rate of rise of the temperature or the rotating speed of the rotary element.

The above-indicated special-shifting-action feasibility determining portion 92 is operated when the special-shifting-action requirement determining portion 90 has determined that a special shift-up or shift-down action of the automatic transmission portion 20 is required for reducing the temperature rise indicated above. The special-shifting-action feasibility determining portion 92 is configured to determine whether the special shift-up or shift-down action is feasible, namely, permitted to be performed. For instance, the determination by the special-shifting-action feasibility determining portion 92 as to whether the special shift-up or shift-down action of the automatic transmission portion 20 is permitted or not (feasible or not) is made by determining whether the iso-power shifting control of the transmission mechanism 10 (differential portion 11) by the hybrid control portion 84 in synchronization with the special shift-up or shift-down action of the automatic transmission portion 20 under the control of the step-variable shifting control portion 82 causes a rise of the rotating speed of the rotary elements of the transmission mechanism 10 beyond the upper limit. The special-shifting-action feasibility determining portion 92 determines that the special shift-up or shift-down action is feasible or permitted to be performed when the iso-power shifting control does not cause an excessive rise of the rotating speed of the rotary elements beyond the upper limit.

Described in detail, the special-shifting-action feasibility determining portion 92 estimates the first electric motor speed $N_{M1}$, second electric motor speed $N_{M2}$ and first planetary gear speed $N_{P1}$ after the iso-power shifting control of the differential portion 11 by the hybrid control portion 84 in synchronization with the special shifting action of the automatic transmission portion 20 under the control of the step-variable shifting control portion 82. If any one of the estimated speeds $N_{M1}$, $N_{M2}$, $N_{P1}$ does not exceed a predetermined limit value, the special-shifting-action feasibility determining portion 92 determines that the special shifting action (shift-up or shift-down action) required to be performed according to the determination by the special-shifting-action requirement determining portion 90 is feasible. If none of the estimated speeds $N_{M1}$, $N_{M2}$, $N_{P1}$ exceeds the predetermined limit value, the special-shifting-action feasibility determining portion 92 determines that the required special shifting action is not feasible and that the differential portion 11 should be subjected to a non-iso-power shifting control to change the operating state of the engine 8 to reduce its output. Thus, the special-shifting-action feasibility determining portion 92 functions as a shifting-action restriction determining portion to determine whether a special action of the automatic transmission portion 20 should be restricted.

When the special-shifting-action feasibility determining portion 92 determines that the special shift-up or shift-down action of the automatic transmission portion 20 required to be performed according to the determination by the special-shifting-action requirement determining portion 90 is feasible, the step-variable shifting control portion 82 implements the special shift-up or shift-down action in the normal manner, and the hybrid control portion 84 implements the iso-power shifting control of the differential portion 11 in the normal manner in synchronization with the shift-up or shift-down action.

When the special-shifting-action feasibility determining portion 92 determines that the special shift-up or shift-down action is not feasible, the step-variable shifting control portion 82 does not implement the special shift-up or shift-down action, and the drive-power-source output reducing portion 86 implements the non-iso-power shifting control of the differential portion 11 to change the operating state of the engine 8 so as to reduce its output for reducing the temperature rise of the first electric motor M1, second electric motor M2 and the working fluid, and limits the output of the vehicle drive power source. For instance, when the special-shifting-action feasibility determining portion 90 determines that the special shifting action of the automatic transmission portion 20 is not feasible, the drive-power-source output reducing portion 96 commands the hybrid control portion 84 to implement the non-iso-power shifting control of the differential portion 11 and to reduce the output of the vehicle drive power source, for reducing the load of the transmission mechanism 10.

When the non-iso-power shifting control is implemented or the output of the vehicle drive power source is limited or reduced, the output of the engine 8 as the vehicle drive power source is limited or reduced, for example. When the output of the engine 8 is limited or reduced, the reaction force which corresponds to the engine output and which is received by the first electric motor M1 is reduced, so that the load of the first electric motor M1 is reduced, whereby the rise of the first electric motor speed $N_{M1}$ is reduced, and the first electric motor temperature $TH_{M1}$ is lowered. Further, the reduction or limitation of the engine output is effective to reduce the electric energy to be supplied from the first electric motor M1 to the second electric motor M2 through the electric path for thereby reducing the load of the second electric motor M2 to reduce the rise of the second electric motor temperature $TH_{M2}$ or lowering the second electric motor temperature $TH_{M2}$. The reduction of the temperature rise of the first electric motor M1 and/or the second electric motor M2, are the lowering of the motor temperature(s) are effective to lower the working fluid temperature $TH_{ATF}$. Further, the reduction of the engine output to be mechanically transmitted to the power transmitting member 18, and the reduction of the electric energy supplied through the electric path from the first electric motor M1 to the second electric motor M2 result in reduction of the output of the second electric motor M2, so that the vehicle drive power to be transmitted to the automatic transmission portion 20 is reduced, and a power loss at the automatic transmission portion 20 is accordingly reduced, whereby the amount of heat generation at the automatic transmission portion 20 is reduced to reduce the rise of the working fluid $TH_{ATF}$, or the working fluid temperature $TH_{ATF}$ is lowered.

Figure 9:
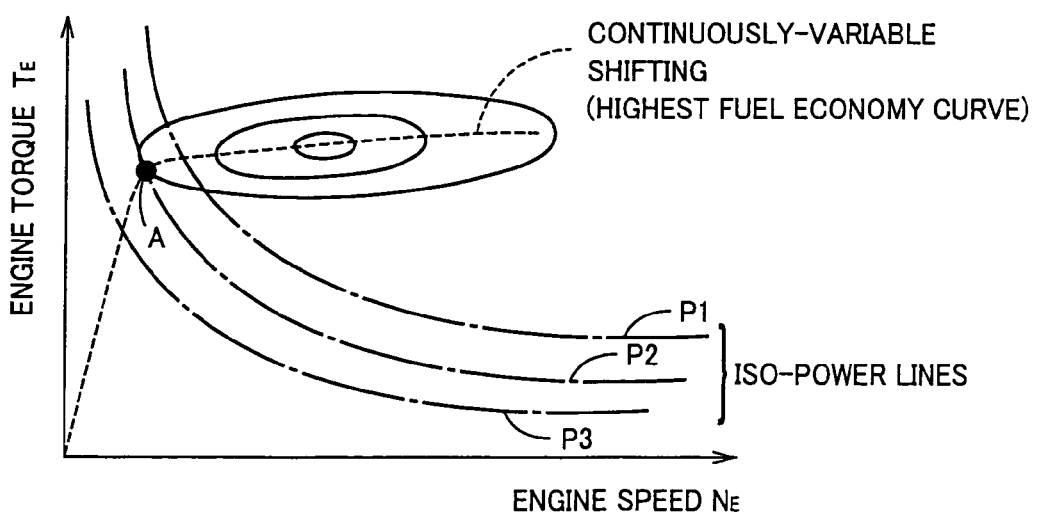
FIG. 9 is a view illustrating an example of a fuel consumption map defining a highest-fuel-economy curve of an engine (indicated by broken line)

For example, the drive-power-source output reducing portion is configured to reduce the output of the engine 8, by either reducing only the engine torque $T_E$ while keeping the engine speed $N_E$ constant, or reducing only the engine speed $N_E$ while keeping the engine torque $T_E$ constant, or alternatively by reducing both the engine speed $N_E$ and the engine torque $T_E$. Preferably, the drive-power-source output reducing portion 86 is configured to reduce both of the engine speed $N_E$ and torque $T_E$ such that the engine output follows the highest fuel-economy curve of the engine 8 as indicated in FIG. 9, so that the deterioration of the fuel economy is reduced or prevented although the vehicle drivability is deteriorated.

The drive-power-source output reducing portion 86 may be configured to reduce or limit the output of the second electric motor M2, rather than the output of the engine 8. For instance, the drive-power-source output reducing portion 86 is configured to reduce the assisting torque produced by the second electric motor M2 in the engine-drive mode. The reduction of the output of the second electric motor M2 results in reducing the load of the second electric motor M2, for thereby reducing the rise of the second electric motor temperature $TH_{M2}$ or lowering the second electric motor temperature $TH_{M2}$, whereby the rise of the working fluid temperature $TH_{ATF}$ is reduced, or the working fluid temperature $TH_{ATF}$ is lowered. Further, the reduction of the output of the second electric motor M2 results in reduction of the vehicle drive power to be transmitted to the automatic transmission portion 20, and reduction of a power loss at the automatic transmission portion 20, so that the amount of heat generation at the automatic transmission portion 20 is reduced to reduce the rise of the working fluid temperature $TH_{ATF}$, or the working fluid temperature $TH_{ATF}$ is lowered.

Regarding the reduction or limitation of the output of the vehicle drive power source by the drive-power-source output reducing portion 86, it is worth considering a rate (speed) and an amount of reduction of the output of the vehicle drive power source. Where at least one of the first electric motor speed $TH_{M1}$, second electric motor speed $TH_{M2}$ and working fluid temperature $TH_{ATF}$ (hereinafter collectively referred to as "system temperature TH", where appropriate) rises rapidly during running of the vehicle on an uphill roadway, for instance, it is desirable to rapidly reduce the output of the vehicle drive power source or reduce the output by a large amount, for rapidly reducing the rise of the system temperature TH or rapidly lowering the system temperature TH. Where the system temperature TH is relatively close to an upper limit, that is, where a difference between the system temperature TH and its upper limit (a margin to the upper temperature limit) is relatively small, too, it is desirable to rapidly reduce the output of the vehicle drive power source or reduce the output by a large amount, for rapidly reducing the rise of the system temperature TH or rapidly lowering the system temperature TH. Thus, the degree of requirement for reducing the output of the vehicle drive power source increases, namely, the degree of requirement for reducing the load of the transmission mechanism 10 increases with a rate or speed of rise of the system temperature TH, and a difference of the system temperature TH to the upper limit.

In view of the foregoing consideration, the drive-power-source output reducing portion 86 is arranged to reduce the output of the vehicle drive power source at a rate which increases with an increase of the degree of requirement for reducing the load of the transmission mechanism 10, and/or by an amount which increases with the increase of the necessity.

Figure 10:
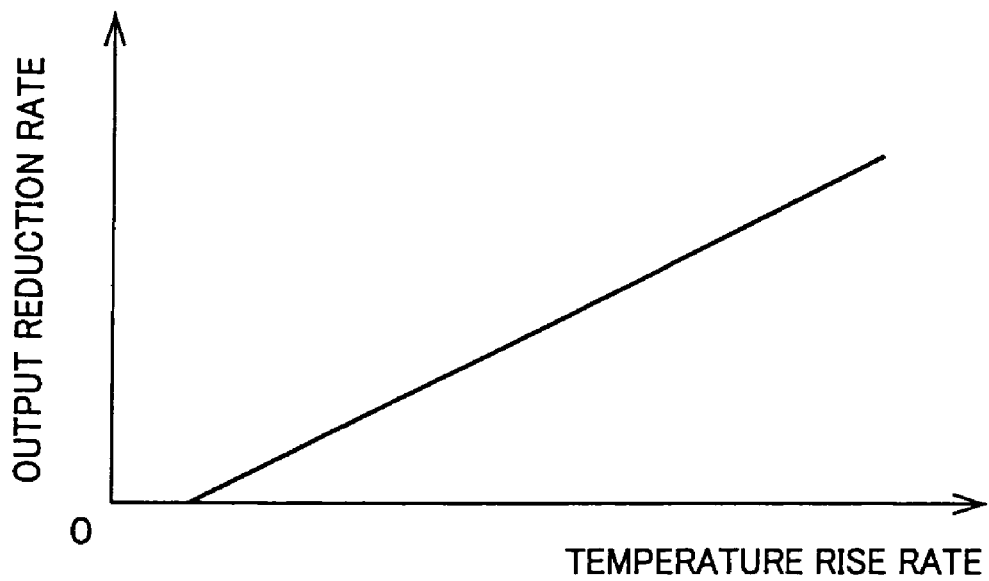
FIG. 10 is a view indicating an example of an output reduction rate map which is a relationship between a rate of rise of a temperature of the hybrid drive system and a rate of reduction of an output of a vehicle drive power source and which is obtained by experimentation and stored in a memory.

The graph of FIG. 10 indicates an example of a relationship between the rate of reduction of the output of the vehicle drive power source and the rate of rise of the system temperature TH (temperature rising speed). This relationship (output reduction rate map) is obtained by experimentation and stored in a memory. As indicated in FIG. 10, the rate of reduction of the output of the vehicle drive power source increases with an increase of the rate of rise of the system temperature TH. The drive-power-source output reducing portion 86 determines the rate of reduction of the vehicle drive power source output on the basis of the rate of rise of the actual system temperature TH and according to the output reduction rate map, and commands the hybrid control portion 84 to reduce the output of the vehicle drive power source at the determined rate.

Figure 11:
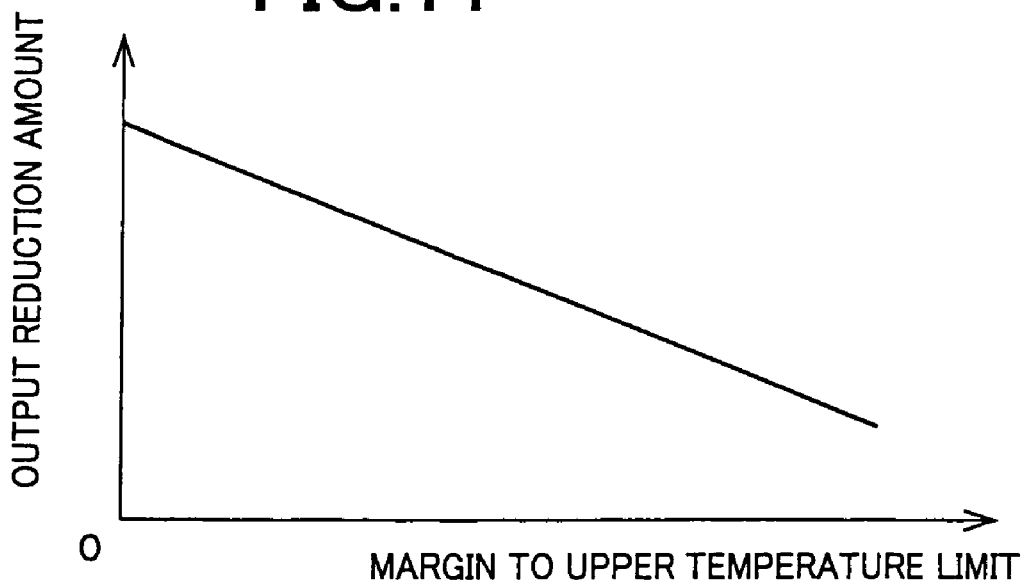
FIG. 11 is a view indicating an example of an output reduction amount map which is a relationship between a margin to an upper limit of the temperature and an amount of reduction of the output of the vehicle drive power source.

The graph of FIG. 11 indicates an example of a relationship between the amount of reduction of the output of the vehicle drive power source and the difference of the actual system temperature TH to the upper limit (margin to the upper temperature limit). This relationship (output reduction amount map) is also obtained by experimentation and stored in a memory. As indicated in FIG. 11, the amount of reduction of the output of the vehicle drive power source increases with a decrease of the difference of the system temperature TH to the upper limit. The drive-power-source output reducing portion 86 determines the amount of reduction of the vehicle drive power source output on the basis of the difference of the actual system temperature TH to the upper limit and according to the output reduction amount map, and commands the hybrid control portion 84 to reduce the output of the vehicle drive power source by the determined amount.

When the drive-power-source output reducing portion 86 implements the non-iso-power shifting control of the transmission mechanism 10 (differential portion 10) or reduces the output of the vehicle drive power source, the drive-power-source output reducing portion 86 commands the above-indicated output reduction indicator 72 (shown in FIG. 4) to inform the vehicle operator that the output of the vehicle drive power source is in the process of being reduced. For example, the output reduction indicator 72 is an indicator light, which is turned on according to a drive command received from the drive-power-source output reducing portion 86. The indicator light is located near the vehicle operator's seat, so that an on state (illuminated state) of the indicator light is visible from the vehicle operator, so that the vehicle operator would not puzzled with an unusual running state of the vehicle caused by the reduction of the output of the vehicle drive power source. In the absence of the output reduction indicator 72, the vehicle operator would feel uneasy with the unusual running state of the vehicle (e.g., unusual starting or acceleration of the vehicle), and may depress the accelerator pedal by an additional amount.

Referring next to the flow chart of FIG. 12, there will be described a control routine executed by the electronic control device 80, for improving the durability of the transmission mechanism 10 even where a special shifting action of the automatic transmission portion 20 is restricted or limited to reduce the load of the transmission mechanism 10. This control routine is repeatedly executed with an extremely short cycle time of about several milliseconds to several tends of milliseconds.

Figure 13:
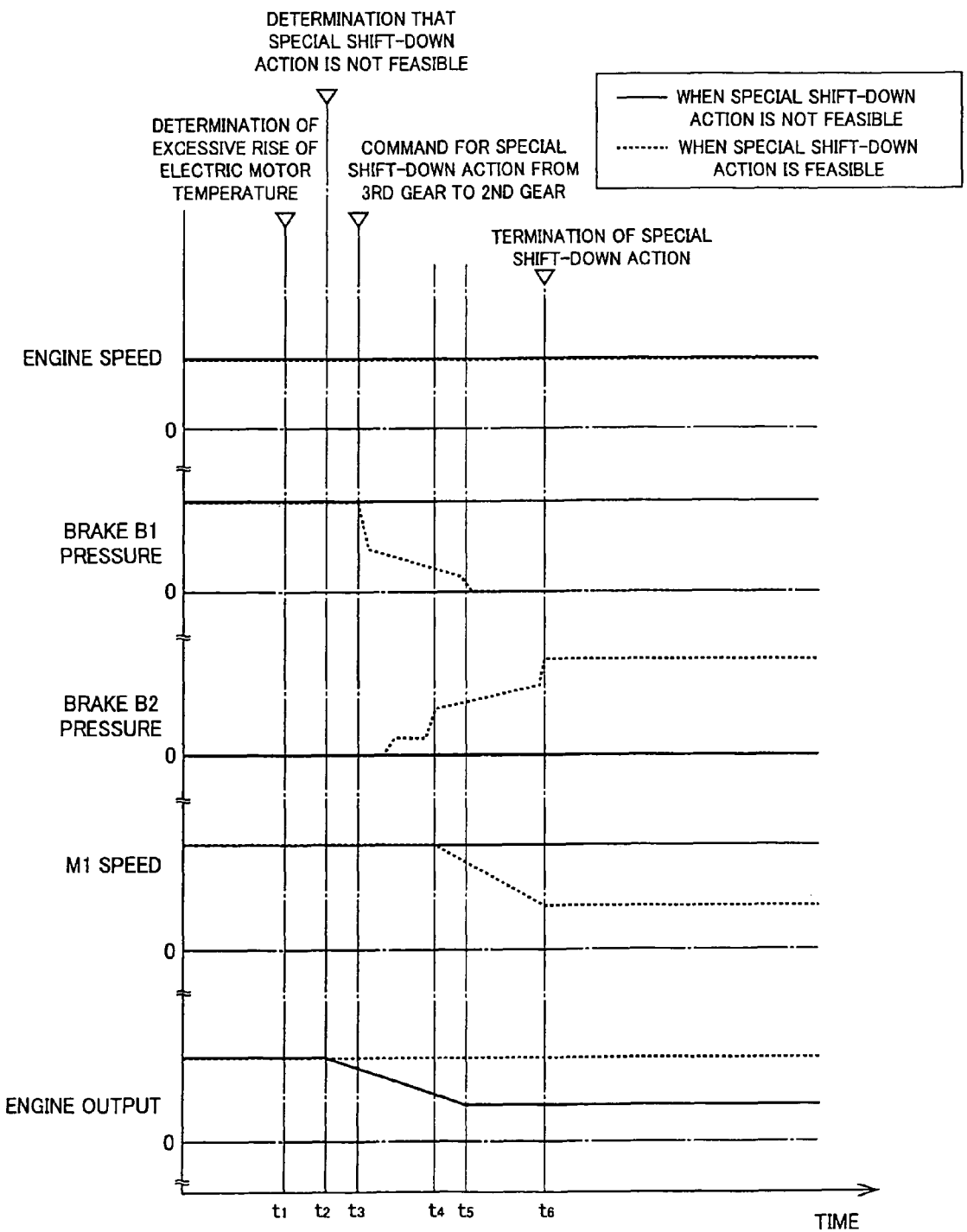
FIG. 13 is a time chart indicating changes of various parameters when a special shift-down action of the automatic transmission portion from a third-gear position to a second-gear position is required due to a rise of a temperature of a first electric motor of the hybrid vehicle drive system

The time chart of FIG. 13 indicates changes of various parameters when a special shift-down action of the automatic transmission portion 20 from the third-gear position to the second-gear position is required due to a rise of the first electric motor temperature $TH_{M1}$.

Figure 12:
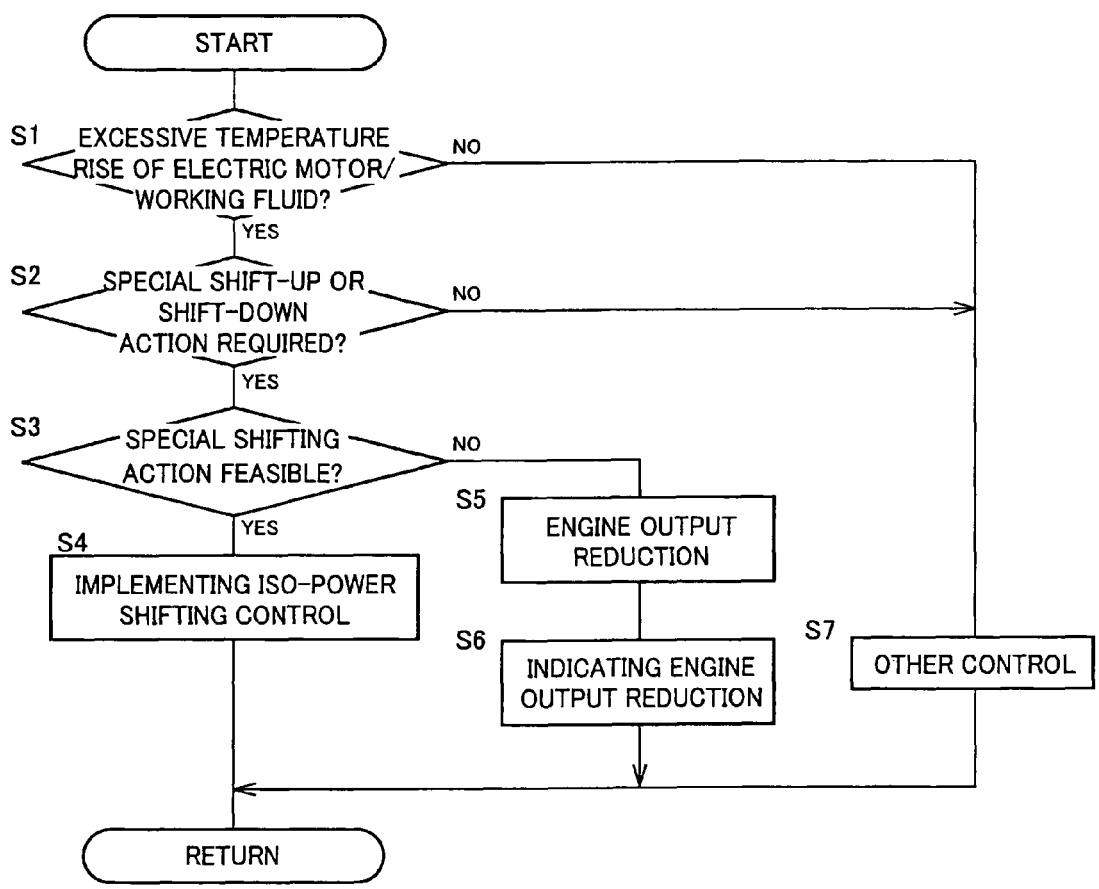
FIG. 12 is a flow chart illustrating a control routine executed by the electronic control device of FIG. 4, for improving the durability of the hybrid vehicle drive system even where a shifting action of the automatic transmission portion is limited or restricted to reduce a load of the hybrid vehicle drive system.

The control routine of FIG. 12 is initiated with step S1 corresponding to the temperature rise determining portion 88, to determine whether at least one of the first electric motor temperature $TH_{M1}$, second electric motor temperature $TH_{M2}$ and working fluid temperature $TH_{ATF}$ has exceeded the predetermined upper limit.

If an affirmative determination is obtained in step S1, the control flow goes to step S2 corresponding to the special-shifting-action requirement determining portion 90, to determine whether a special shift-up or shift-down action of the automatic transmission portion 20 placed in a certain gear position selected according to the shifting boundary line map as indicated in FIG. 8 by way of example is required to be performed for lowering the excessively high temperature or temperatures $TH_{M1}$, $TH_{M2}$, $TH_{ATF}$ below the upper limit, that is, for reducing the rise of the system temperature TH.

If a negative determination is obtained in step S1 or S2, the control flow goes to step S7 to implement a control other than the controls to reduce the rise of the system temperature TH (first electric motor temperature $TH_{M1}$, second electric motor temperature $TH_{M2}$ and working fluid temperature $TH_{ATF}$). Alternatively, the present control routine is terminated without implementing step S7.

If an affirmative determination is obtained in step S2, the control flow goes to step S3 corresponding to the special-shifting-action feasibility determining portion 92, to determine whether the special shift-up or shift-down action of the automatic transmission portion 20 determined in step S2 to be performed is feasible or permitted. This determination is made by determining whether the rotating speed of any rotary element of the transmission mechanism 10 will be expected to exceed the limit value if the required special shift-up or shift-down action is actually performed.

If an affirmative determination is obtained in step S3, the control flow goes to step S4 corresponding to the step-variable shifting control portion 82 and hybrid control portion 84, in which the special shift-down or shift-up action of the automatic transmission portion 20 is performed for lowering the excessively high system temperature TH, and at the same time the iso-power shifting control of the transmission mechanism 10 (differential mechanism 11) is implemented.

If a negative determination is obtained in step S3, the control flow goes to step S5 corresponding to the drive-power-source output reducing portion 82, to implement the non-iso-power shifting control of the differential portion 11 so as to change the operating state of the engine 8 to reduce its output power, for lowering the system temperature TH, and the output of the vehicle drive power source is reduced or limit, for example, the output of the engine 8 is reduced to reduce the load of the transmission mechanism 10.

Step S5 is followed by step S6 also corresponding to the drive-power-source output reducing portion 86, to command the output reduction indicator 72 to be turned on (illuminated) for informing the vehicle operator that the output of the vehicle drive power source (engine 8, for example) is in the process of being reduced.

In the time chart of FIG. 13, the special-shifting-action requirement determining portion 90 determines at a point of time t1 that a special shift-down action of the automatic transmission 20 is required to be performed for lowering at least one of the first electric motor speed $TH_{M1}$ and the second electric motor speed $TH_{M2}$ which has exceeded the upper limit. If this shift-down action is feasible and permitted to be performed, the step-variable shifting control portion 82 generates, at a point of time t3, a command to shift the automatic transmission portion 20 from the third gear position to the second gear position, as indicated by broken lines in FIG. 13, and at the same time the hybrid control portion 84 implements the iso-power shifting control to maintain the engine speed $N_E$ substantially constant during the shift-down action, as also indicated by the broke lines. During this iso-power shifting control, the first electric motor speed $N_{M1}$ is lowered for a period from a point of time t4 to a point of time t6 with a rise of the input shaft speed $N_{IN}$ due to the shift-down action of the automatic transmission portion 20 while the output of the engine 8 is held constant.

If the special-shifting-action feasibility determining portion 92 determines at a point of time t2 that the shift-down action of the automatic transmission 20 for reducing the rise of the first electric motor speed $N_{M1}$ and/or the second electric motor speed $N_{M2}$ is not feasible or not permitted to be performed, since the shift-down action will cause a rise of the first planetary gear speed $N_{P1}$ beyond the limit value, the command to shift down the automatic transmission 20 from the third gear position to the second gear position is not generated, and the shift-down action is replaced by the reduction of the output of the vehicle drive power source (engine 8, for example) for reducing the temperature rise of the first electric motor M1 and second electric motor M2, as indicated by solid line in FIG. 13. In the specific example of FIG. 13, the output of the engine 8 is reduced by reducing only the engine torque $T_E$ while the engine speed $N_E$ is held constant. The reduction of the output of the engine 8 is initiated at the point of time t2 at which the shift-down action is determined to be unfeasible, and is continued up to a point of time t5. The rate and amount of reduction of the engine output are determined on the basis of the actual rate of rise of the first electric motor temperature $TH_{M1}$ and/or second electric motor temperature $TH_{M2}$ and the margin to the upper temperature limit, and according to the output reduction rate map and output reduction amount map of FIGS. 10 and 11.

Accordingly, the reaction force which corresponds to the output of the engine 8 and which is received by the first electric motor M1 is reduced, even where the special shifting action of the automatic transmission portion 20 is not permitted due to an expected excessive rise of a rotary element of the transmission mechanism 10, so that the excessively high system temperature TH (at least one of the first electric motor temperature $TH_{M1}$, second electric motor speed $TH_{M}2$ and working fluid temperature $TH_{ATF}$) can be lowered to improve the durability of the transmission mechanism 10.

As described above, the control apparatus in the form of the electronic control device 80 according to the present embodiment which includes the drive-power-source output reducing portion 86 is configured such that the non-iso-power shifting control of the transmission mechanism 10 is implemented and the output of the vehicle drive power source is reduced, under the control of the drive-power-source reducing portion 86, rather than a special shifting action of the automatic transmission 20 is performed under the control of the step-variable shifting control 82 for reducing the load of the transmission mechanism 10, together with the iso-power shifting control implemented under the control of the hybrid control portion 84 so as to establish the desired overall speed ratio γT which is defined by the speed ratios of the differential portion 11 and automatic transmission portion 20. The non-iso-power shifting control and the reduction of the vehicle drive power source by the drive-power-source output reducing portion 86 are implemented when an excessive rise of the rotating speed of a rotary element of the transmission mechanism 10 is expected to take place as a result of the special shifting action of the automatic transmission portion 20 under the control of the step-variable shifting control portion 82 and the iso-power shifting control in synchronization with the special shifting control The non-iso-power shifting control implemented by the drive-power-source reducing portion 86 permits the engine 8 to be operated in an operating condition which assures an efficient operation of the electric motor, while preventing an excessive rise of the rotating speeds of the rotary elements of the transmission mechanism 10, so that the durability of the transmission mechanism 10 is improved, even in the condition in which the special shifting action of the automatic transmission portion 20 should be restricted.

Described in more detail, the non-iso-power shifting control and the reduction of the output of the vehicle drive power source not only prevent an excessive rise of the rotating speed of a rotary element of the transmission mechanism 10 beyond the limit value, for example, an excessive rise of at least one of the first electric motor speed $N_{M1}$, second electric motor speed $N_{M2}$ and first planetary gear speed $N_{P1}$, but also reduce the load of the transmission mechanism 10 for reducing a rise of the system temperature TH or lowering the system temperature TH, to improve the durability of the transmission mechanism 10, owing to the reduction of the output of the vehicle drive power source, even when the shifting action of the automatic transmission portion 20 required to be performed for reducing the load of the transmission mechanism 10 and the rise of the system temperature TH is restricted or limited.

The present embodiment is further configured such that the rate of reduction of the output of the vehicle drive power source by the drive-power-source reducing portion 86 increases with an increase of the degree of requirement for reducing the load of the transmission mechanism 10. Accordingly, the output of the vehicle drive power source can be suitably reduced to suitably reduce a rise of the system temperature TH or lower the system temperature TH. Where the system temperature TH rapidly rises, or where the difference of the system temperature TH with respect to the upper limit is relatively small, for example, the output of the vehicle drive power source is rapidly reduced to rapidly lower the system temperature TH.

The present embodiment is further configured such that the amount of reduction of the output of the vehicle drive power source by the drive-power-source reducing portion 86 increases with an increase of the degree of requirement for reducing the load of the transmission mechanism 10. Accordingly, the output of the vehicle drive power source can be suitably reduced to suitably reduce a rise of the system temperature TH or lower the system temperature TH. Where the system temperature TH rapidly rises, or where the difference of the system temperature TH with respect to the upper limit is relatively small, for example, the output of the vehicle drive power source is reduced by a relatively large amount to lower the system temperature TH by a relatively large amount.

While the preferred embodiment of this invention haw been described in detail by reference to the accompanying drawings, it is to be understood that the present invention may be otherwise embodied.

In the illustrated embodiment, the hybrid control portion 84 is arranged to implement the iso-power shifting control such that the overall speed ratio γT is held substantially constant during a shifting action of the automatic transmission portion 20 under the control of the step-variable shifting control portion 82. However, this iso-power shifting control is not essential. For example, the speed ratio of the differential portion 11 may be controlled so as to establish a desired value of the overall speed ratio γT, so as to prevent an excessive rise of the rotating speed of a rotary element of the transmission mechanism 10 beyond the limit value, and so as to permit the engine 8 to operate following the highest fuel-economy curve, during a shifting action of the automatic transmission portion 20 which takes place according to the shifting boundary line map. When the rotating speed of any rotary member of the transmission mechanism 10 exceeds the upper limit during this control of the overall speed ratio γT under the control of the hybrid control portion 84, the drive-power-source output reducing portion 86 reduces the output of the vehicle drive power source for reducing the load of the transmission mechanism 10, rather than the hybrid control portion 84 implements the ordinary iso-power shifting control of the differential portion 11.

In the illustrated embodiment, the determination as to whether a special shifting action of the automatic transmission portion 20 other than a shifting action required according to the shifting boundary line map is required is made by the special-shifting-action requirement determining portion by determining whether at least one of the first electric motor temperature $TH_{M1}$, second electric motor temperature $TH_{M2}$ and working fluid temperature $TH_{ATF}$ has exceeded the predetermined upper limit. However, the determination may be made on the basis of any other parameter indicative of the load of the transmission mechanism 10, for determining whether a special shifting action of the automatic transmission 20 is required for reducing the load of the transmission mechanism 10.

In the illustrated embodiment, the output reduction indicator 72 in the form of an indicator light is provided to inform the vehicle operator that the output of the vehicle drive power source is in the process of being reduced. However, any other type of device may be provided in addition to or in place of the output reduction indicator 72, to inform the vehicle operator of the reduction of the output of the vehicle drive power source, by means of indication of characters, or generation of a message or sound, or vibration, for instance.

Although the differential portion 11 (power distributing mechanism 16) in the illustrated transmission mechanism 10 functions as an electrically controlled continuously variable transmission the gear ratio γ0 of which is continuously variable from the minimum value $γ0_{min}$ to the maximum value $γ0_{max}$, the differential portion 11 may be modified such that its speed ratio γ0 is not variable continuously, but is variable in steps by utilizing its differential function. The present invention is applicable to a hybrid vehicle drive system including the differential portion modified as described above.

Further, the differential portion 11 in the illustrated transmission mechanism 10 may be provided with a differential limiting device which is incorporated in the power distributing mechanism 16 and which is operable as a step-variable transmission having two forward-drive positions by limiting the differential function of the differential portion 11.

In the power distributing mechanism 16 in the illustrated transmission mechanism 10, the first carrier CA1 is fixed to the engine 8, and the first sun gear S1 is fixed to the first electric motor M1 while the first ring gear R1 is fixed to the power distributing member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated transmission mechanism 10, the engine 8 may be operatively connected to the input shaft 14 through any suitable member such as gears and a belt, and need not be disposed coaxially with the input shaft 14.

In the illustrated transmission mechanism 10, the first and second electric motors M1, M2 are disposed coaxially with the input shaft 14 such that the first electric motor M1 is connected to the first sun gear S1 while the second electric motor M2 is connected to the power transmitting member 18. However, this arrangement is not essential. For instance, the first electric motor M1 may be operatively connected to the first sun gear S1 through gears, a belt or a speed reduction device, while the second electric motor M2 may be connected to the power transmitting member 18.

The hydraulically operated frictional coupling devices such as the first and second clutches C1, C2 in the illustrated transmission mechanism 10 may be replaced by coupling devices of magnetic powder type, electromagnetic type and mechanical type, such as powder clutches, electromagnetic clutches, meshing-type dog clutches. Where the electromagnetic clutches are used, the switching valve devices incorporated in the hydraulic control unit 70 are replaced by a switching device for controlling electric control signals for selectively energizing and de-energizing solenoids of the electromagnetic clutches, for example.

In illustrated transmission mechanism 10, the automatic transmission portion 20 is disposed in the power transmitting path between the output member of the differential portion 11 or power distributing member 16 in the form of the power transmitting member 18 and the drive wheels 34. However, this automatic transmission portion 20 may be replaced by any other type of automatic transmission portion (automatic transmission), such as a continuously-variable transmission (CVT), and a permanent-meshing parallel two-axes type transmission provided with selecting and shifting cylinders arranged to automatically perform a shifting action. The control apparatus according to the present invention is equally applicable to a vehicular drive system including such type of automatic transmission portion.

In the illustrated embodiment, the automatic transmission portion 20 is connected in series to the differential portion 11 through the power transmitting member 18. However, the automatic transmission portion 20 may be disposed coaxially with a counter shaft disposed parallel to the input shaft 14. In this case, the differential portion 11 and the automatic transmission portion 20 are connected to each other through a suitable power transmitting member or members in the form of a pair of counter gears, or sprockets and a chain, such that a rotary motion can be transmitted between the differential portion 11 and the automatic transmission portion 20.

Further, the power distributing mechanism 16 provided in the illustrated embodiment may be replaced by a differential gear device including a pinion rotated by the engine 8, and a pair of bevel gears which mesh with the pinion and which are operatively connected to the first electric motor M1 and the power transmitting member 18 (second electric motor M2).

While the power distributing mechanism 16 in the illustrated embodiment is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear sets are not limited to the single-pinion type, and may be of a double-pinion type.

In the illustrated embodiment, the manually operable shifting device 50 is provided with the shift lever 52 manually operable to select one of the plurality of shift positions $P_{SH}$. However, the shift lever 52 may be replaced by pushbutton switches, a slide-type or any other type of switch manually operable to select a desired one of the shift positions $P_{SH}$, or replaced by devices not operated by hand, such as a device operated in response to a voice of the vehicle operator or operated by foot, to select one of the shift positions $P_{SH}$. Although the shift lever 52 has the manual forward-drive position M for selecting the number of the forward-drive gear positions available for automatic shifting of the automatic transmission portion 20, the shift lever 52 placed in the manual forward-drive position M may be used to manually shift up or down the automatic transmission portion 20, within the range from the first gear position through the fourth gear position, by operating the shift lever 52 from the position M to the shift-up position "+" or shift-down position "−".

It is to be understood that the embodiment of the invention has been descried for illustrative purpose only, and that the present invention may be embodied with various changes and modifications which may occur to those skilled in the art.

What is claimed is:

1. A control apparatus for a vehicular drive system including (a) an electrically controlled differential portion having a differential mechanism and operable to control a differential state between its input and output speeds by controlling an operating state of an electric motor connected to a rotary element of the differential mechanism, and (b) an automatic transmission portion which constitutes a part of a power transmitting path between the electrically controlled differential portion and a drive wheel of a vehicle, said control apparatus comprising:
    a non-iso-power shifting control portion causing a drive power to be limited or reduced when a required shifting action of the automatic transmission portion is restricted, and
    wherein the vehicular drive system further includes a vehicle drive power source operatively connected to the electrically controlled differential portion, and
    said non-iso-power shifting control portion includes a drive-power-source output reducing portion to reduce an output of said vehicle drive power source when the required shifting action of the transmission portion is restricted.

2. The control apparatus according to claim 1, wherein the vehicle drive power source includes an engine connected to a rotary element of the differential mechanism, and said drive-power-source output reducing portion reduces an output of the engine.

3. The control apparatus according to claim 1, wherein the vehicle drive power source includes a second electric motor which is provided in addition to said electric motor provided as a first electric motor and which is operatively connected to the rotary element of the differential mechanism, and said drive-power-source output reducing portion reduces an output of the second electric motor.

4. The control apparatus according to claim 1, wherein said required shifting action of the automatic transmission portion is a shifting action required to be performed for reducing a rise of a temperature of said electric motor.

5. The control apparatus according to claim 1, wherein said required shifting action of the automatic transmission portion is a shifting action required to be performed for reducing a rise of a temperature of a working fluid used for the automatic transmission portion.

6. The control apparatus according to claim 1, wherein said drive-power-source output reducing portion reduces the output of the vehicle drive power source at a rate which increases with an increase of a rate of rise of at least one of temperatures of the electric motor and a working fluid used for the automatic transmission portion.

7. The control apparatus according to claim 1, wherein said drive-power-source output reducing portion reduces the output of the vehicle drive power source by an amount which increases with a decrease of a difference of at least one of temperatures of the electric motor and a working fluid used for the automatic transmission portion to a predetermined upper limit.

8. The control apparatus according to claim 1, further comprising a special-shifting-action requirement, determining portion to determine that a special shifting action of the automatic transmission portion is required, when a rate of rise of at least one of temperatures of the electric motor and a working fluid used for the automatic transmission portion is higher than a predetermined upper limit.

9. The control apparatus according to claim 1, further comprising a special-shifting-action requirement determining portion to determine that a special shifting action of the automatic transmission portion is required, when a difference of at least one of temperatures of the electric motor and a working fluid used for the automatic transmission portion with respect to a predetermined upper limit is smaller than a predetermined threshold value.

10. The control apparatus according to claim 1, further comprising a shifting-action restriction determining portion to determine that said required shifting action of the automatic transmission portion is restricted, when a rotating speed of a rotary element of the vehicular drive system is higher than a predetermined limit value.

11. The control apparatus according to claim 10, wherein the vehicular drive system has a plurality of rotary elements, and said shifting-action restriction determining portion determines that said required shifting action is restricted, when at least one of rotating speeds of the plurality of rotary elements is higher than the predetermined limit value.

12. The control apparatus according to claim 10, wherein the vehicular drive system has a plurality of rotary elements, and said shifting-action restriction determining portion determines that said required shifting action is restricted, when a relative rotating speed of the plurality of rotary elements is higher than a predetermined upper limit.

13. The control apparatus according to claim 10, wherein said predetermined limit value is a value below which a rotating speed of the electric motor connected to said differential mechanism is not expected to exceed a permissible limit value.

14. The control apparatus according to claim 10, wherein the vehicle drive power source includes a second electric motor which is provided in addition to said electric motor provided as a first electric motor and which is operatively connected to the rotary element of the differential mechanism, and said predetermined limit value is a value below which a rotating speed of said second electric motor is not expected to exceed a permissible limit value.

15. The control apparatus according to claim 10, wherein said predetermined limit value is a value below which a relative rotating speed of a pinion gear of said differential mechanism is not expected to exceed a permissible limit value.

16. The control apparatus according to claim 10, wherein said predetermined limit value is a value below which a rotating speed of an input-side rotary member of the automatic transmission portion is not expected to exceed a permissible limit value.

17. The control apparatus according to claim 1, wherein said electrically controlled differential portion is operable as a continuously variable transmission, by controlling an operating state of said electric motor.

18. The control apparatus according to claim 1, wherein said automatic transmission portion is a step-variable automatic transmission portion.

19. The control apparatus according to claim 1, further including an engine and a power transmitting member, wherein said differential mechanism is a planetary gear set having a carrier connected to the engine, a sun gear connected to the first electric motor, and a ring gear connected to the power transmitting member.

20. The control apparatus according to claim 19, wherein said planetary gear set is a single-pinion type planetary gear set.

21. The control apparatus according to claim 1, wherein the vehicular drive system has an overall speed ratio which is defined by a speed ratio of the automatic transmission portion and a speed ratio of the electrically controlled differential portion.

* * * * *